(12) United States Patent
Margulis

(10) Patent No.: US 6,456,340 B1
(45) Date of Patent: *Sep. 24, 2002

(54) APPARATUS AND METHOD FOR PERFORMING IMAGE TRANSFORMS IN A DIGITAL DISPLAY SYSTEM

(75) Inventor: Neal Margulis, Woodside, CA (US)

(73) Assignee: Pixonics, LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/294,259

(22) Filed: Apr. 19, 1999

Related U.S. Application Data

(60) Provisional application No. 60/096,322, filed on Aug. 12, 1998.

(51) Int. Cl.[7] .................................................. H04N 3/26
(52) U.S. Cl. ........................ 348/745; 348/746; 348/747; 348/806; 345/501
(58) Field of Search .............................. 348/745, 746, 348/747, 806, 807, 441, 448, 452, 50; 345/501, 507, 509, 196, 419, 420, 427, 429–431, 433, 437, 147, 150, 136; 386/52; 172/32, 36, 35, 34

(56) References Cited

U.S. PATENT DOCUMENTS

| 4,463,380 A |   | 7/1984 | Hooks, Jr. ................ 348/580 |
| 4,894,653 A | * | 1/1990 | Frankenbach ............. 340/703 |
| 5,092,671 A |   | 3/1992 | Van Os |
| 5,140,416 A |   | 8/1992 | Tinkler |
| 5,341,174 A |   | 8/1994 | Xue et al. |
| 5,369,432 A |   | 11/1994 | Kennedy |
| 5,426,471 A |   | 6/1995 | Tanaka et al. |
| 5,442,411 A | * | 8/1995 | Urbanus et al. ........... 348/771 |
| 5,559,676 A |   | 9/1996 | Gessaman |
| 5,592,239 A |   | 1/1997 | Hara et al. ................ 348/771 |
| 5,594,676 A |   | 1/1997 | Greggain et al. |
| 5,652,616 A |   | 7/1997 | Chen et al. |
| 5,719,594 A |   | 2/1998 | Potu |
| 5,737,019 A |   | 4/1998 | Kim |
| 5,748,264 A | * | 5/1998 | Hegg ........................ 348/746 |
| 5,748,865 A |   | 5/1998 | Yamamoto et al. ......... 395/123 |
| 5,754,260 A |   | 5/1998 | Ooi et al. |
| 5,764,311 A | * | 6/1998 | Bonde et al. .............. 348/746 |
| 5,832,085 A | * | 11/1998 | Inoue et al. ................ 348/411 |
| 5,872,590 A | * | 2/1999 | Aritake et al. ............... 348/57 |
| 5,883,670 A | * | 3/1999 | Sporer et al. ............... 348/441 |
| 5,920,688 A | * | 7/1999 | Cooper et al. .............. 395/137 |
| 5,936,628 A | * | 8/1999 | Kitamura et al. ........... 345/420 |
| 5,950,015 A | * | 9/1999 | Korst et al. .................... 348/7 |
| 6,035,093 A | * | 3/2000 | Kazami et al. ............... 386/52 |
| 6,044,181 A | * | 3/2000 | Szeliski et al. ............. 345/437 |
| 6,157,396 A | * | 12/2000 | Margulis et al. ............ 345/506 |

OTHER PUBLICATIONS

Foley, Van Dam, Feiner, Hughes: Computer Graphics Principals and Practice; 1990; pp. 155–165, 564–567, 822–834; Addison Wesley.

Patrick Candry: Projection Systems; Display Systems; 1997; pp. 237–256; John Wiley and Sons.

Charles McLaughlin, Dave Armitage: Prospects for Microdisplay Based Rear Projection; 1996.

(List continued on next page.)

Primary Examiner—John Miller
Assistant Examiner—Trang U. Tran
(74) Attorney, Agent, or Firm—Wells, St. John P.S.

(57) ABSTRACT

An image processing apparatus for use in a display system comprises a display device for viewing image, and a geometric transformation module that is configured to precondition said image data with geometric transformations to thereby compensate for characteristics of the display system. The geometric transformation module may include a spatial transformation module for redefining spatial relationships between image pixels, an alignment and rotation correction module for repositioning image pixels, a focus correction module for correcting image defocus, a distortion correction module for correcting image distortions, and a multi-frame correlation module for performing motion-compensated frame rate conversion.

34 Claims, 11 Drawing Sheets

OTHER PUBLICATIONS

Snell & Wilcox; Kudos NRS500 Online Product Guide; pp. 1–2.

Snell & Wilcox: Kudos NRS30 Online Product Guide; pp. 1–2.

Pixelworks: PW364 Image Processor Data Sheet; www.pixelworksinc.com/products/364datasheet.html.

Faroudja Labs: VP401 On Line Product Overview; Jul. 28, 1998.

Faroudja Labs: VP50 On Line Product Overview; Jul. 28, 1998.

Darim: M–Filter Product Overview; 1997; pp. 1–3.

D. W. Parker; The Dynamic Performance of CRT and LC Displays; Getting the Best from State–of–the–Art Display Systems; Feb. 21–23, 1995; London, UK; Society for Information Display.

* cited by examiner

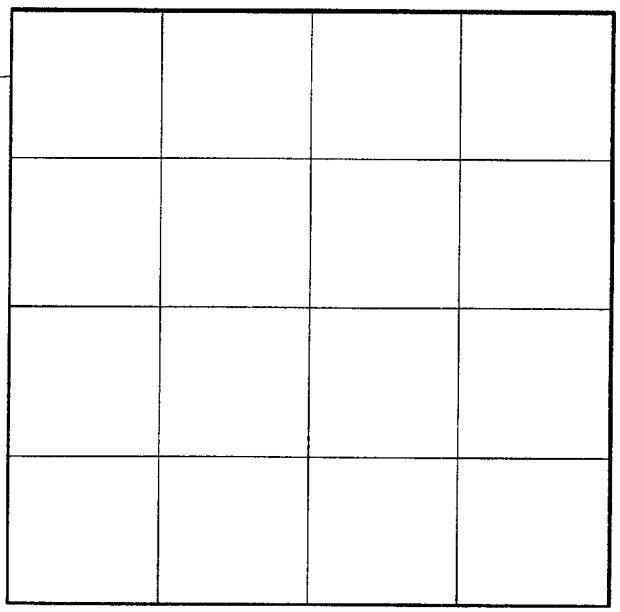
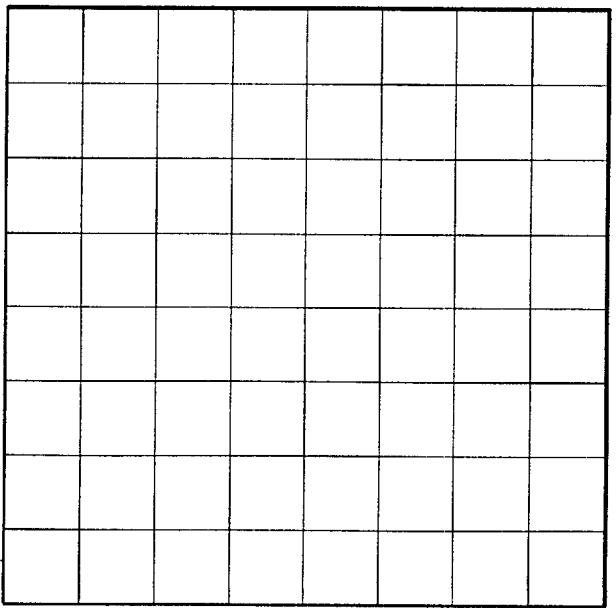
FIG. 8

6,456,340 B1

APPARATUS AND METHOD FOR PERFORMING IMAGE TRANSFORMS IN A DIGITAL DISPLAY SYSTEM

CROSS-REFERENCE TO RELATED APPLICATIONS

This patent application claims the benefit of U.S. Provisional Patent Application Ser. No. 60/096,322 filed on Aug. 12, 1998, and is also related to co-pending U.S. patent application Ser. No. 90/250,424, entitled "System and Method for Using Bitstream Information to Process Images for Use in Digital Display Systems," filed on Feb. 16, 1999, and to U.S. patent Application Ser. No. 09/277,100 entitled "System and Method for Using Temporal Gamma and Reverse Super-Resolution to Process Images for Use in Digital Display Systems" filed on Mar. 26, 1999, which are hereby incorporated by reference.

BACKGROUND OF THE INVENTION

1. Field of the Invention

The present invention relates generally to image processing for a digital display system, and relates more particularly to an apparatus and method for performing image transforms and multi-frame processing of input images to produce high-quality output images.

2. Discussion of Prior Art

Cathode Ray Tubes (CRTs), used in conventional televisions and computer monitors, are analog devices which scan an electron beam across a phosphor screen to produce an image. Digital image-processing products that enhance display graphics and video on CRTs have been increasingly available, because CRTs can operate with many different input and output data formats. Further, CRTs can display moving images with high quality screen brightness and response. However, CRTs have considerable limitations in such applications as portable flat-screen displays where size and power are important. Additionally, as direct-view CRT display size increases, achieving high image quality across the complete display becomes more difficult and expensive.

Many recent portable and desktop systems include digital displays using liquid crystal displays (LCDs), a term which generally describes flat-panel display technologies and in particular, may include active matrix liquid crystal displays (AMLCDs), silicon reflective LCDs (si-RLCDs), ferroelectric displays (FLCs), field emission displays (FEDs), electroluminescent displays (ELDs), plasma displays (PDs), and digital mirror displays (DMDs).

Compared to traditional CRT displays, LCDs have the advantages of being smaller and lighter, consuming less power, and having discrete display elements which can provide consistent images across the entire display. However, manufacturing LCDs requires special processing steps to achieve acceptable visual quality. Further, large screen direct view LCDs are expensive, and LCDs usually require a display memory.

Both CRT and LCD technologies can provide economical projection-system large screen displays. CRT-based projection systems usually require three CRTs and three projection tubes, one for each of the Red (R), Green (G), and Blue (B) color components. Each tube must produce the full resolution display output at an acceptable brightness level, which makes the tubes expensive. Achieving proper tolerances for mechanical components in projection systems, including alignment hardware and lenses, is also expensive. Consequently, manufacturing CRT-based projection systems is costly. Since CRTs are analog devices, applying digital image-processing techniques to CRT-based systems usually requires a frame buffer memory to effectively represent the digital image data.

Projection display systems also may use transmissive or reflective LCD "microdisplay" technologies. Achieving the desired full color gamut in LCD-based parallel color projection systems, as in CRT-based projection systems, uses three separate LCD image modulators, one for each of the R, G, and B color components. A single LCD image modulator which produces R, G, and B, either through spatial color filters or with sequential color fields at a sufficiently high rate, can provide a low cost system.

FIG. 1 shows a prior art projection system 150 that includes a light system 100, mirrors 102, 104, 106, and 108, transmissive image modulators 110, 112, and 114, dichroic recombiners 116 and 118, and a projection lens 120. Light system 100 includes an illumination source such as a xenon lamp and a reflector system (not shown) for focusing light.

Mirrors 102, 104, 106, and 108, together with other components (not shown) constitute a separation subsystem that separates the light system 100 output white light beam into color components Red (R), Green (G), and Blue (B). The separation subsystem can also use prisms, including x-cube dichroic prism pairs or polarizing beam splitters.

Each image modulator 110, 112, and 114 receives a corresponding separated R, G, or B color component and functions as an active, full resolution, monochrome light valve that, according to the desired output images, modulates light intensities for the respective R, G, or B color component. Each image modulator 110, 112, and 114 can include a buffer memory and associated digital processing unit (not shown). A projection system may use only one image modulator which is responsible for all three color components, but the three image modulator system 150 provides better chromaticity and is more efficient.

Dichroic recombiners 116 and 118 combine modulated R, G, and B color components to provide color images to projection lens 120, which focuses and projects images onto a screen (not shown).

FIG. 1 system 150 can use transmissive light valve technology which passes light on axis 1002 through an LCD shutter matrix (not shown). Alternatively, system 150 can use reflective light valve technology (referred to as reflective displays) which reflects light off of digital display mirror display (DMD) image modulators 110, 112, and 114. Because each image modulator 10, 112, and 114 functions as an active, full resolution, monochrome light valve that modulates the corresponding color component, system 150 requires significant buffer memory and digital image processing capability.

Because of inherent differences in the physical responses of CRT and LCD materials, LCD-based projection and direct view display systems each have different flicker characteristics and exhibit different motion artifacts than CRT-based display systems. Additionally, an intense short pulse depends on the properties of CRT phosphors to excite a CRT pixel, whereas a constant external light source is intensity modulated during the frame period of an LCD display. Further, LCDs switch in the finite time it takes to change the state of a pixel. Active matrix thin film transistor (TFT) displays, which have an active transistor controlling each display pixel, still require a switching time related to the LCD material composition and thickness, and to the techniques of switching.

Most LCD-based image modulators (such as 110, 112, 114) are addressed in raster scan fashion and each pixel requires refreshing during each display frame interval. Accordingly, every output pixel is written to the display during every refresh cycle regardless of whether the value of the pixel has changed since the last cycle. In contrast, active matrix display technologies and some plasma display panel technologies may allow random access to the display pixels. Other panels use a simpler row-by-row addressing scheme that is similar to the raster scan of a CRT. Additionally, some displays have internal storage to enable output frames to self-refresh based on residual data from the previous output frame.

Field Emission Displays (FEDs) may include thousands of microtips grouped in several tens of mesh cells for each pixel. The field emission cathodes in FEDs can directly address sets of row or column electrodes in FEDs, and FEDs have rapid response times. FEDs can use external mesh addressing for better resolution images, but this requires increased input/output (I/O) bandwidth outside of the FED.

Opto-mechanical systems can provide uniform brightness and high chromaticity for high quality displays. Additionally, high quality projection lens systems can provide bright and uniform images. However, component and assembly tolerances in opto-mechanical systems can result in system imperfections including imprecise image modulator alignment and geometric lens distortion.

Commercially-available digital image processing systems, usually part of an electronic control subsystem, can process analog or digital input data and format the data into higher resolution output modes. These processing systems typically perform operations such as de-interlacing, format conversion and line doubling or quadrupling for interlaced analog input data. Some systems include a decompression engine for decompressing compressed digital data, and input data scaling to match the resolution and aspect ratio to the display device. However, these systems do not perform advanced image processing that is specific to a digital imaging LCD or to the display system. Additionally, these digital image processing systems do not often accommodate digital or compressed digital image data which can include bitstream information for enhanced outputs.

Image sensing algorithms, for example, in remote sensing and computer vision applications, use special sampling and image warping techniques to correct input sensor distortions and to reconstruct images. The technique of super-resolution uses multiple still frame images which include sub-pixel movement, typically from camera movement, to construct a high resolution still frame.

Data compression tools such as those standardized by the Moving Pictures Experts Group (MPEG) can compact video data prior to transmission and reconstruct it upon reception. MPEG-2 can be applied to both standard definition (SDTV) and high definition television (HDTV) in a variety of resolutions and frame rates.

Projecting an image from a projector on a tabletop to a flat screen which is closer to the projector at the screen bottom than the screen top results in an image which is narrower at the bottom than at the top in what is known as the "Keystone" effect.

Radial distortion occurs when an image pixel is displaced from its ideal position along a radial axis of the image. Because an image has the largest field angles in the display corners, the corners exhibit worse radial distortion than other display areas. Radial distortion includes barrel distortion, where image magnification decreases towards the corners, and pin cushion distortion, where the magnification increases towards the corners. Lens related distortions including radial distortion can cause image deformation. Distortion can also result from non-flat screens or the Earth's magnetic field.

Image modulators (such as 110, 112, 114) have a fixed number of pixels spaced uniformly in a pattern. This type of uniform pattern is called an affinity-mapped display. Projecting an image from an image modulator to a display screen deforms the uniformity of pixel spacing. In other words, pixels are not correlated one-to-one from the image modulator to the display screen. Therefore, some screen display regions have more image modulator pixels than screen pixels while other screen display regions have fewer image modulator pixels than screen pixels.

For panoramic displays, motion artifacts appear where image objects move near the edges of curved screens. Even when a flat screen projection is motion-adaptive filtered, the difference in the distances of objects from the projector causes an apparent motion of moving objects on a curved screen. Additionally, extremely large curved screens can achieve necessary resolution and brightness only with film projectors.

Multiple camera systems are commonly used to improve display quality on curved screen displays. For example, two cameras record overlapping halves of a scene to improve output. A layered coding technique may include a standard MPEG-2 stream as a base layer and enhancement information as a supplemental layer. Even if the two views are from slightly different angles, the compression ratio for the two camera views combined is less than the total compression ratio would be if each view were captured and compressed independently. Additionally, the second camera can provide a view that may be occluded from the first camera. Systems using additional camera angles for different views can provide additional coded and compressed data for later use. Multiple camera systems can also compensate for the limited focal depth of a single camera and can substitute for the use of a depth-finding sensor which senses and records depth information for scenes. Image processing can improve the outputs of multiple camera systems.

Stereoscopic photography also uses multi-camera systems in which a first camera records a left-eye view and a second camera records a right-eye view. Because camera lenses focus at a certain distance, one camera uses one focal plane for all objects in a scene. A multi-camera system can use multiple cameras each to capture a different focal plane of a single scene. This effectively increases the focal depth. Digital image processing can further improve focusing for these multi-camera systems.

Types of three dimensional binocular display systems include anaglyph displays, frame sequence displays, autostereoscopic displays, single and multi-turn helix displays. These normally have multiple camera data channels. Anaglyph systems usually require a user to wear red and green glasses so that each eye perceives a different view. Frame sequencing systems use shutter glasses to separate left and right views. Autostereoscopic displays use lenticular lenses and holographic optical elements. Single or multi-turn helix displays use multiple semi-transparent display screens which can be seen by multiple observers without special glasses. Multiple camera data channel systems can benefit from image processing.

Each R, G, and B color component has different intensity values which are digitally represented by a number of bits. For example, if 8 bits represent each R, G, and B color component, then each component has 256 ($=2^8$) intensity values from 0 to 255. Changing the intensity value of a color component in an ideal digital device from a number X, for example, to a number Y, takes just as long regardless of the Y value. Consequently, changing a color component value from 2 to3 takes as long as changing the value from 2 to 200. However, because of the nature of LCD image modulator pixels, the transitions for modulating light intensities are not purely digital, and various analog distortions remain.

Therefore, for all the foregoing reasons, what is needed is an image processing system to effectively enhance display quality and thereby provide the best possible visual images.

SUMMARY OF THE INVENTION

The present invention relates generally to image processing for a digital display system, and relates more particularly to an apparatus and method for performing image transforms and multi-frame processing of input images to produce high-quality output images. The image processing and digital display system are useful for DTV displays and electronic theatres, and can process different types of data inputs including analog, digital, compressed bitstream and coded bitstream display images.

In one embodiment of the present invention, the image processing uses the input data, along with the known characteristics of the particular display system, and advantageously performs geometric transformation to produce pre-compensated output images that are stored to a display modulator. The pre-compensated display modulator images are then projected to a display screen where the foregoing geometric transformation allows the displayed images to accurately portray the input images.

The geometric transformation produces high quality projection images through redefining the spatial relationship between image pixels to correct for image defocus, image distortion and misalignment and rotation of image modulators. In order to perform pre-compensation, improved resolution image representations are used, including high definition input images and input images enhanced through multiframe reconstruction. Multiframe reconstruction uses multiple input images, along with motion tracking information that ties the images together, to produce a higher resolution representation of each input image. The motion tracking information can either be provided as part of an input bitstream or produced by the system in a motion estimation module.

The geometric transformation may also provide special functions such combining multiple input images into a single output image, texture mapping an output image or producing specially constructed outputs for panoramic and 3D displays. The special information for display objects may either be extracted by the image processing system or for better results, the object information is provided as specially coded information in a bitstream. The present invention thus effectively and efficiently performs image transforms and multi-frame processing of input images to produce high-quality output images.

BRIEF DESCRIPTION OF THE DRAWINGS

FIG. 8 is a diagram that shows an image having an 8×8 pixel resolution and a display having a 4×4 pixel resolution, in accordance with one embodiment of the present invention;

DETAILED DESCRIPTION OF THE PREFERRED EMBODIMENTS

The present invention relates to an improvement in electronic processing technology. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention comprises an image processing apparatus for use in a display system, including a display device for viewing image, and a geometric transformation module that is configured to precondition said image data with geometric transformations to thereby compensate for characteristics of the display system. The geometric transformation module may include a spatial transformation module for redefining spatial relationships between image pixels, an alignment and rotation correction module for repositioning image pixels, a focus correction module for correcting image defocus, a distortion correction module for correcting image distortions, and a multi-frame correlation module for performing motion-compensated frame rate conversion.

Figure 1:
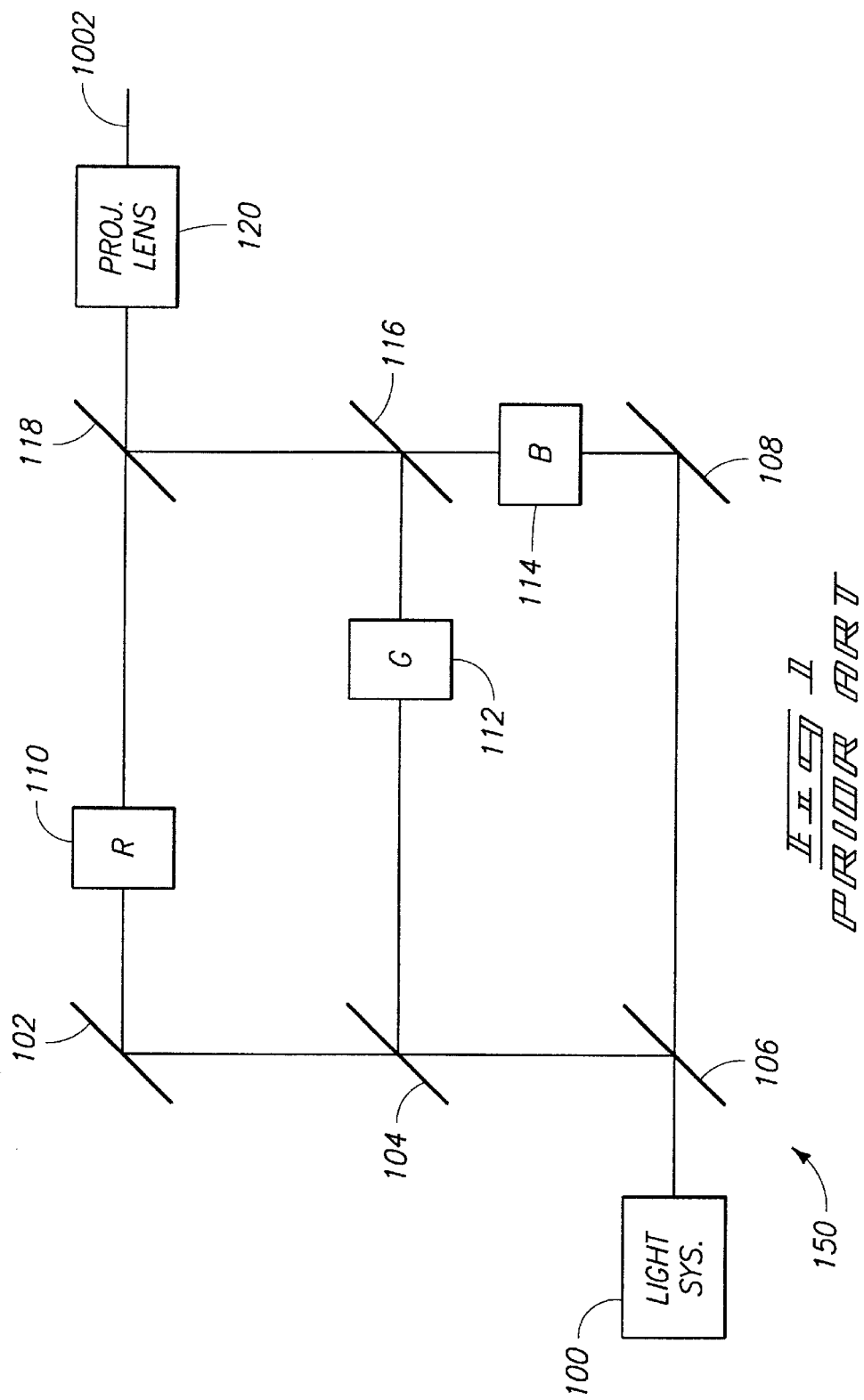
FIG. 1 is a block diagram of a prior art projection display system using three transmissive LCD imaging elements.
Figure 2:
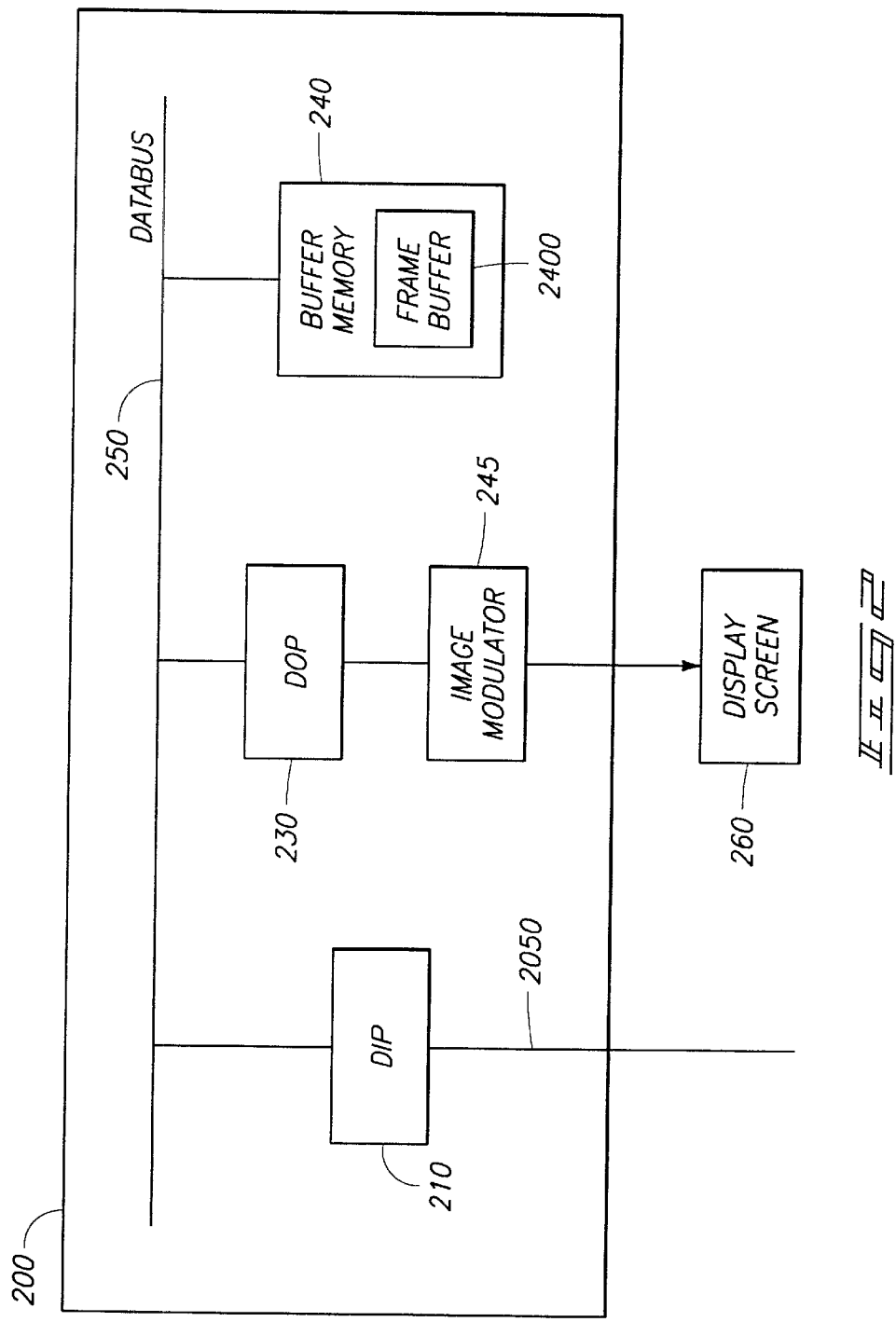
FIG. 2 is a block diagram for one embodiment of an image processing system, in accordance with the present invention.

FIG. 2 shows an image processing system 200 which includes a Display Input Processor (DIP) 210, a Display Output Processor (DOP) 230, and a buffer memory 240, all coupled to a common databus 250. System 200 also includes an image modulator 245 (comparable to FIG. 1 modulators 110, 112, and 114) coupled to DOP 230 and to an external display screen 260. DIP 210 preferably receives images on line 2050 and reconstructs the images both spatially and temporally. DIP 210 outputs are processed by DOP 230 to enhance image visual quality. DOP 230 outputs, preferably in frame format, are stored in frame buffer 2400 which is part of buffer memory 240. Buffer memory 240 stores data for use by DIP 210 and DOP 230. Frame buffer 2400, which stores image data for outputting to image modulator 245 or to a digital memory (not shown), is preferably part of buffer memory 240, but alternatively can be part of the digital memory, which can in turn be part of buffer memory 240.

Image modulator 245 can be part of a CRT-based or LCD-based direct view system, displaying images that can be in pixel format on display screen 260. However, if image modulator 245 is part of a projection system, then image modulator 245 provides images to be projected and enlarged onto display screen 260. In a projector system, image modulator 245 is relatively small (inches) and may be either a stationary or a movable element. To increase the apparent resolution of the displayed images, a reverse super-resolution technique, in accordance with the present invention, adjusts the data values written into a stationary image modulator 245 at an increased frame rate. For a movable image modulator 245, the invention, preferably during each output frame in a cycle, moves image modulator 245 to effectively shift the display pixel matrix a fraction of a pixel in the X and Y directions, preferably at the screen refresh rate.

System 200 processes image data in a high-resolution internal format to preserve detailed image information, because such information can be lost in each of the various image processing steps if the internal image format has lower resolution than the output of image modulator 245. System 200, for example, can assume that the processed image has four times (doubled vertically and horizontally) better pixel resolution than the (spatial resolution) output of image modulator 245.

Figure 3:
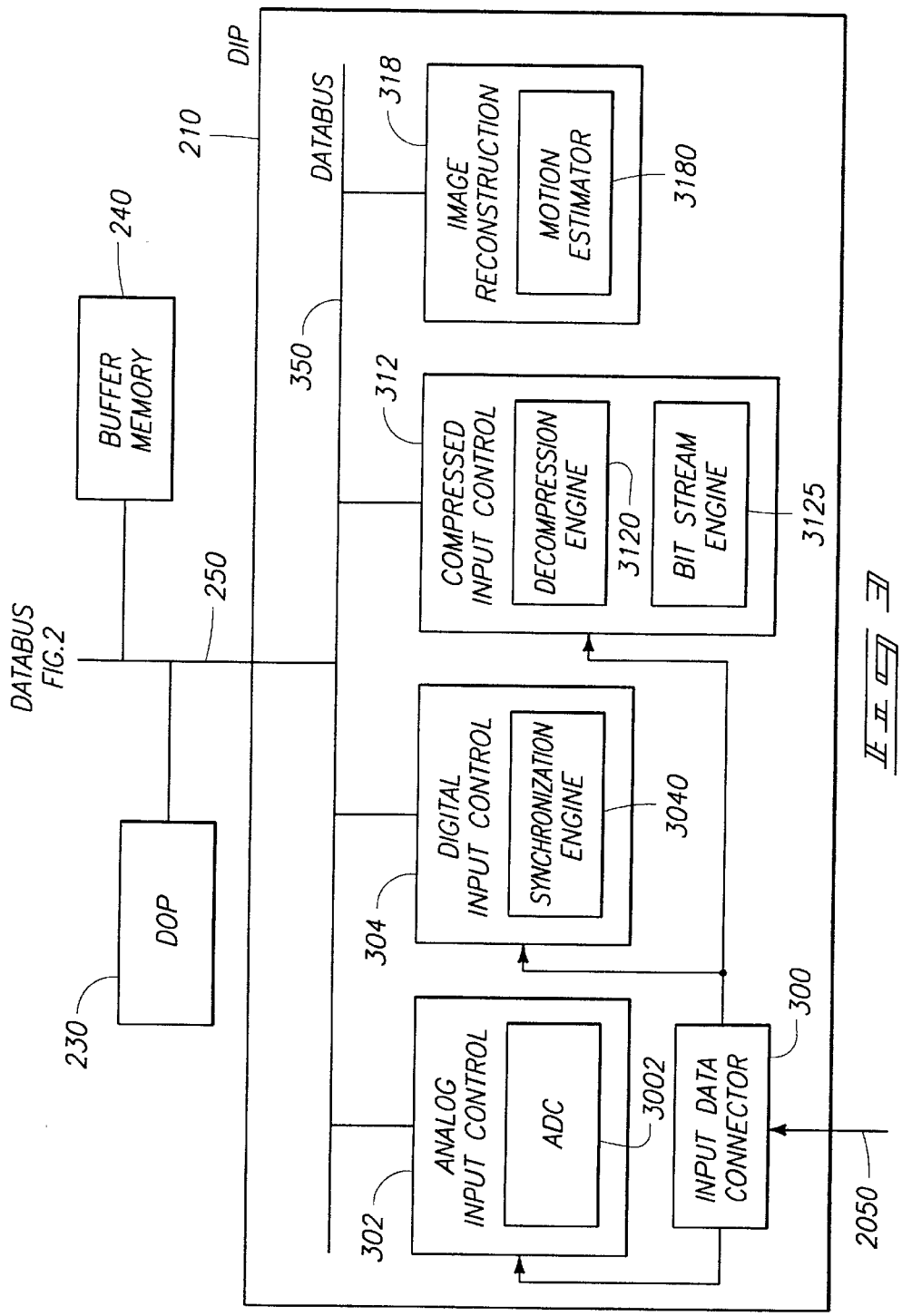
FIG. 3 is a block diagram for one embodiment of the FIG. 2 DIP 210, in accordance with the present invention.

FIG. 3 is a block diagram of FIG. 2 DIP 210, including image processing modules Analog Input Control 302, Digital Input Control 304, Compressed Input Control 312, and Image Reconstruction (IR) 318, all connected to a common databus 350. DIP 210 also includes one or more input data connectors 300 for receiving image data input to system 200 on line 2050. The image data may include one or more of analog video, digital video, non-tuned data, graphics data, or compressed data. Analog or digital video data may be, in a native video format such as composite video, S-video, or some component YUV/YCrCb. Non-tuned data, receiving from a broadcast delivery system that may have many channels on a common carrier, may require a tuner included in or separate from DIP 210 so that relevant data can be tuned from the channels. Compressed data may be in MPEG-2 format, which includes video and audio content, the data containing control or video overlay information for DOP 230. MPEG-2 video data may be in a variety of standard and high definition field or frame based formats that also may differ in the aspect ratio of the input image and may differ in the frame rate of the input image. Image data on line 2050 may be encrypted for security and thus require decryption by DIP 210.

Accompanying the image data, DIP 210 also receives various control data including for example, selected inputs, data types, vertical blanking interval (VBI) data, overlay channel information for the on-screen display (OSD), and provides this control data to DOP 230. Each of the image processing modules, Analog Input Control 302, Digital Input Control 304, and Compressed Input Control 312, preferably receives image data from connector 300. A system microcontroller (not shown) preferably uses user-selected input controls to select image data, which is appropriately processed by each of modules 302, 304, and 312, and then preferably stored in buffer memory 240. The system microcontroller also uses the user input commands to control windowing for picture-in-picture displays, OSD information, and other system windowing capabilities. DIP 210 preferably processes images in either YUV or RBG formats.

Analog Input Control 302 preferably includes an analog-to-digital converter (ADC) 3002, which samples the analog data inputs and produces digital data outputs. ADC 3002, to achieve high quality, samples its input data frequently and precisely enough that the image can be reconstructed from the sampled data points. Additional prior art techniques for sub-carrier demodulation are used to extract the video data from the analog input signal.

Digital Input Control 304 preferably includes a synchronization engine 3040 and processes digital data, which may be in a YUV video or a digital RBG format. Since the data is already in digital format, Digital Input Control 304 does not include an ADC. Digital Input Control 304 also uses high-speed digital data transmittal techniques that are described in the Institute of Electrical and Electronics Engineering (IEEE) standard 1394, Low Voltage Differential Signaling (LVDS), and Panel Link. These standards include line termination, voltage control, data formatting, phase lock loops (PLLs), and data recovery to assure that Digital Input Control 304 properly receives the digital data input.

Compressed Input Control 312, preferably including a decompression engine 3120 and a Bitstream Engine 3125, processes compressed data that usually includes audio, video, and system information. System information may provide information regarding the bitstream, such as if the video data is interlaced or non-interlaced. Compressed Input Control 312, prior to decompression by decompression engine 3120, preferably demodulates the compressed digital data. Alternatively, a preprocessing system (not shown) may demodulate the data and provide it to Compressed Input Control 312. Compressed Input Control 312, performing additional steps such as error correction, assures that it properly receives the data and that the data is not corrupted. If the data is corrupted, Compressed Input Control 312 may conceal the corruption. Compressed Input Control 312, once having correctly received the data, de-multiplexes the data into audio, video, and system streams, and provides the audio streams to an audio subsystem (not shown) for decoding and playback. Compressed Input Control 312 decompresses an encoded bitstream input, but retains relevant motion vector information for use in further processing.

Bitstream Engine 3125 combined with Decompression engine 3120 optimizes reconstruction of compressed input bitstreams, preferably MPEG-2 data, into enhanced video frames in a manner that has not been used in prior art video enhancement products. The bitstream information includes compliant video coded bitstreams, bitstreams with side information, layered codings for video and special bitstreams that have additional detail information leaked into a compliant bitstream. Lower-layer coded data can reveal object shapes and other information that can be exploited to provide enhanced spatial and temporal rendering of blocks constituting images. Decompression engine 3120, can perform the prior art steps of decoding a compliant MPEG-2 bitstream into a decoded picture.

Bitstream Engine 3125 processes the MPEG-2 bit streams including the image blocks (or macroblocks). Since most video frames within a sequence are highly correlated, Bitstream Engine 3125 exploits this correlation to improve rendering. Bitstream Engine 3125 also employs motion estimation techniques for motion compensated prediction as a method of temporal processing across image frames. Bitstream Engine 3125 can track the flow of video data prescribed by the prediction blocks belonging to the macroblocks within the bitstream, rather than re-estimating motion or creating the macroblocks similarly to a second pass encoding process. Bitstream Engine 3125 tracks the prediction blocks over several frames in which the temporal path of the prediction blocks delineates a coarse trajectory of moving objects. This coarse trajectory can be refined by additional sub-block motion estimation and bitstream processing performed either in the Bit Stream Engine 3125 or by the Motion Estimator 3180. Bitstream Engine 3125 preserves the motion vector information for later use in generating DOP 230 output frames in conjunction with motion compensated temporal filtering and reverse super-resolution. The information can also be used for constructing a special block filter for post decompression filtering of the coded input stream so that IR 318 can filter artifacts of block boundary edges.

Buffer memory 240 receives data from Analog Input Control 302, Digital Input Control 304, and Compressed Input Control 312, and provides the data to Image Reconstruction 318. Buffer memory 240 also stores IR 318 output data.

IR 318 preferably includes a Motion Estimator 3180 and receives image data from Analog Input control 302, Digital Input Control 304, Compressed Input Control 312, or from buffer memory 240. IR 318 processes data based on data types. For example, if data in YUV format requires a conversion to the RGB domain, then IR 318, through either mathematics calculations or a look-up table, converts YUV values to RGB color space. However, IR 318 preferably processes image frames while they are still in the YUV color space and, if required, RGB color space conversion is performed during one of the last image processing steps by DOP 230. Additionally, YUV data is often sub-sampled, that is, one UV pair may correspond to two or four Y values. Consequently, IR 318 uses the UV values to interpolate and create RGB pixels. If YUV data is interlaced then IR 318 converts the data from field based (sequential half frames) to frame based. IR 318 stores each field in buffer memory 240, then filters, analyzes, and combines the fields to generate an input image frame. IR 318, if required, retransmits the processed input frames in analog video format. Nevertheless, IR 318 preferably uses the processed image frames and the motion information created by DIP 210 while the frames and the information are still in their digital format. If IR 318 processes data, such as overlay information, relevant to image modulator 245 (FIG. 2), IR 318 provides such data to DOP 230 to later be combined with the image data frames. IR 318 may process multiple input data streams in parallel and provide such data to DOP 230 to later produce a picture-in-picture display of multiple images. IR 318 also does post decompression filtering based on block boundary information included in the input bitstream.

For analog video inputs, IR 318 preferably uses techniques from, for example, Faroudja Labs and Snell & Willcox and Darim, that can sample and reconstruct input video, which includes composite, S-Video, and Component (Y, Cr, Cb) that may follow one of the industry standards such as Phase Alternative Line (PAL) or the National Television Standards Committee (NTSC). IR 318, to spatially filter for high quality image frames, preferably uses various techniques for noise reduction, such as recursive, median filter, and time base correction.

In the present invention, IR 318 takes account of multiple input images and then, to enhance the resolution of those images, uses super-resolution techniques that employ data shared by different input frames to reconstruct an image, and thereby to produce each output frame. This cannot be done by independently using one input image at a time. The invention is thus advantageous over prior art systems which use super-resolution techniques for generating high-resolution still images from a video sequence, but not for generating real time output frames. The super-resolution techniques used by the invention depend on a high correlation of the data between frames, and require a sub-pixel shift of the input images, typically based on slight movements of objects in the images. IR 318, in correlating images to reconstruct output frames, uses motion vectors provided by Motion Estimator 3180 or preserved from the input bitstream. IR 318, while generating still frames, can use mathematical equations from, for example, deterministic techniques of Projections On Convex Sets (POCS) and stochastic techniques of Bayesian enhancements.

When an image does not include MPEG-2 motion vector bitstream information, Motion Estimator 3180 preferably uses techniques such as optical flow, block matching, or Pel-recursion to estimate motion that tracks the image object motion in time. Motion Estimator 3180 can also use the same motion estimation techniques in conjunction with MPEG-2 motion vector bitstream information. Motion Estimator 3180 compares groups of pixels from one image field to those of subsequent and previous image fields to correlate object motion. Motion Estimator 3180 then records the detected motion relative to the field position so that DOP 230, together with input frame information and IR 318 motion information, can later generate motion-compensated image frames. For compression systems, Motion Estimator 3180 finds the best match between frames, then codes the mismatches. Motion Estimator 3180 masks out motion vectors that do not meet a certain level of matching criteria, and tags the vectors that have a high level of matching so that these vectors can subsequently be used in more refined motion tracking operations, which are performed on smaller image blocks or on individual pixels. Motion Estimator 3180 thus differs from prior art techniques in which video compression systems use the detected motion as one of the steps to compress the number of bits needed to represent a video sequence. Motion estimation is not used in a standard compliant decoder that simply performs motion compensation using the coded motion vectors and macroblocks. Consequently, the invention, via Motion Estimator 3180, advantageously provides better quality images than prior art techniques.

Because detecting motion is important in restoring images, Motion Estimator 3180 (and other processing modules according to the invention) tracks motion on a sub(or smaller) block basis. For example, instead of on an 8×8 (pixels) block, Motion Estimator 3180 tracks motions on a 2×2 block, which tracks more refined motions. To reduce the need to track refined sub-blocks, Motion Estimator 3180 uses the course block matching differences to pre-qualify a block, and thus does not perform refined tracking on a blocks that are poor matches. Conversely, Motion Estimator 3180 does perform refined tracking on blocks that closely match.

When receiving motion estimation vectors, such as those provided in an MPEG-2 data stream, Decompression Engine 3120 uses all of the vectors for compliant MPEG-2 Decoding. IR 318 then uses vectors with better block matching in analyzing refined motions for restoring multiple frames. Analyzing refined motions can produce motion vectors for sub-block pixel sizes, which can be used in multiframe reconstruction to better produce high resolution output frames.

IR 318 preferably separates its output images into video fields or frames, and creates a pointer to the start of each field (or frame). Either the actual field (or frame) data or a pointer to the field (or frame) data may serve as inputs to DOP 230. Processing input video fields and producing frames that combine fields is useful for de-interlacing video in the image reconstruction process, which in turn is useful for increasing image resolution and for restoring the vertical detail that was lost during interlacing. IR 318 outputs (and DOP 230 outputs), having been reconstructed in accordance with the invention can have a higher resolution than can be supported by the number of pixels of image modulator 245. IR 318 outputs can be stored in buffer memory 240 or in a metafile that includes a description of the image both in a spatial RGB frame buffer format and in a semantic description of the image objects, textures, and motions. The digital processing system of the DIP 210 utilizes techniques such as super-resolution to produce images that have higher resolution than the individual input images. Other analog techniques are used in the DIP 210 combined with the super-resolution techniques for producing the high-resolution internal representation of the images.

In accordance with the present invention, a geometric transformation may also be used for processing the input data that includes a layered coding video bitstream. The foregoing geometric transformation may either be performed as part of GT 404 in the DOP, or a Geometric Transform Module may alternately be included as part of the Image Reconstruction 318 in order to reconstruct input video frames. One technique for tracking image flow is to compare the coefficient data of the input bitstream to find the same patterns across time. If the same pattern is found, it may represent the flow of an object across the frames. With layered coding, the conjecture of image flow can be further tested in the different layers to either confirm or reject the conjecture. Layered video coding is a technique for scalability which, for example, transmits multiple resolutions of video bitstreams where the higher resolutions utilize the bits from the lower resolution transmissions. In this coding technique, a lower resolution decoder, according to the present invention, can discard the higher resolution bitstreams, and because the higher resolution bitstreams, instead of regenerating the entire bitstream, use the lower resolution bitstreams, the overall bandwidth for the higher resolution bitstream increases. Additionally, because the MPEG-2 specification specifies the complete profile for layered coding techniques, the invention provides additional control information accompanying the bitstream to comply with the MPEG-2 specification. Layered coding can also be part of a non-MPEG-2 bitstream such as is proposed for future H. 263 extensions.

Layered coding techniques may include other types of compressed data, such as wavelet data, to enhance a base level transmission. For example, wavelet data may be included as a layered stream of data. Wavelet data is compressed data that does not use the same DCT (Discrete Cosign Transform) compression scheme as the standard video portion of MPEG-2 video data. As part of the MPEG-2 syntax, the wavelet data could be coded as a private video data stream, or could be part of the video program stream and indicated in the program header information. The wavelet information represents a higher resolution image for a complete or partial frame for some or all of the MPEG-2 frames. When an MPEG-2 frame that has corresponding wavelet information is decoded, the IR 318 combines the MPEG-2 data with the wavelet data. Because of the different characteristics of DCT and wavelet-based compression, the combination is used to produce a single high quality output frame.

Another example of layered coding is where supplemental bitstream data includes motion estimator information that is an enhancement beyond the standard X and Y macroblock motion estimator vectors that are part of the MPEG-2 standard. For example, motion estimator information that relates to the scale, rotation and sheer of image elements can also be provided as supplemental bitstream data. For example, if a camera is zooming in or out of a scene, improved block matching for the encoder system can be achieved by using a scale-based compare instead of the X and Y displacement compare. As a second example, a moving object may rotate instead of move in the X or Y direction. A rotation compare will have a more accurate motion estimator comparison than standard motion vectors. Both the encoder system and the enhanced decoder system need to use a commonly defined protocol to take advantage of layered coding techniques. IR 318 can use the supplemental information relating to scale, rotation and sheer of image elements to reconstruct, preferably-using image transform techniques, a higher quality image from the input bitstream.

Another enhanced decoder operation of IR 318 uses instructional cues embedded in a bitstream for interpreting the video stream to utilize the macroblock and motion vector information for enhancing output images. The advantages of instructional cues are very significant over the ability to extract frame-to-frame and GOP-to-GOP correlation without the cues. Because IR 318 maintains complete GOPs in buffer memory 240, IR 318 can utilize these cues which provide information across fields, frames, and GOPs. For example, the enhanced decoder of the invention uses the macroblock information from two GOPs. For another example, IR 318 recognizing the enhanced instructional cues and improves image quality by using macroblock information from both a current GOP and an adjacent GOP. The invention is therefore advantageous over prior techniques using standard decoders that do not keep previous fields and frame information any longer than required to decode and display output frames. Additionally, the standard decoder cannot recognize the instructional cues or utilize the motion vector only for the best match within adjacent frames. Also, while the enhanced decoder of the invention can use the instructional cues to achieve a higher quality display output, the standard decoder can use the video bitstream in a standard-compliant manner. Instructional cues require only a minor amount of data to be added to the bitstream.

Figure 4:
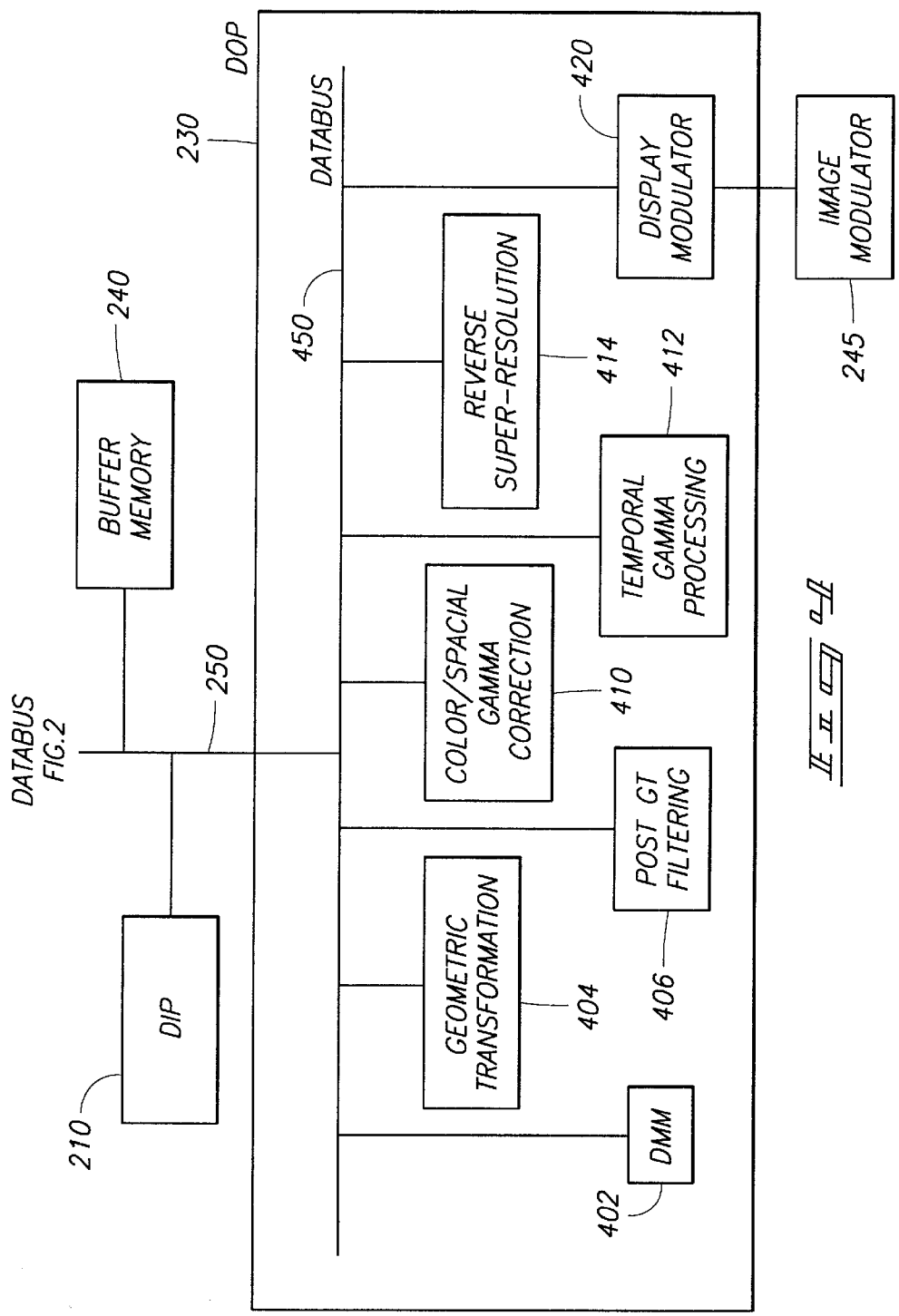
FIG. 4 is a block diagram for one embodiment of the FIG. 2 DOP 230, in accordance with the present invention.

FIG. 4 is a block diagram of FIG. 2 DOP 230, which has a display map memory (DMM) 402 and image processing modules including Geometric Transformation 404, Post GT Filtering 406, Color/Spatial Gamma Correction 410, Temporal Gamma Processing (TGP) 412, Reverse Super-Resolution 414, and Display Modulation (DM) 420, all connected to a common databus 450. Databus 450 satisfies system bandwidth and concurrency requirements for parallel image processing. DOP 230 also connects to buffer memory 240, which stores data frames for use by each of the processing modules 402, 404, 406, 410, 412, 414, and 420, although each of these modules may include a local memory buffer (not shown).

DOP 230 receives DIP 210 outputs either directly or via buffer memory 240. DOP 230 can use pointers (if applicable) to directly access DIP 210 output data. DOP 230 also receives multiple DIP 210 output images for performing picture-in-picture operations where a single image frame includes more than one processed input video frame. DOP 230 combines overlay data both from the input coded data and from any on-screen display (OSD) information such as a user menu selection provided by the system microcontroller. DOP 230 processes its input images and outputs image data including display coordination for both video and data output, and data and control signals for each R, G, and B image color component. Frame buffer 2400 (FIG. 2) can store DOP 230 outputs. The digital processing of DOP 230 is distinguishable from prior art systems through the performance of various operations, including the geometric transformations of the present invention. While traditional filtering techniques may be used by DIP 210 and after GT, the GT 404 distinguishes this system from prior art in the ability to perform the affinity mapping of the DIP output to the image modulator to pre-compensate for distortions that occur during projection that occurs from the modulator to the display screen.

In the FIG. 4 embodiment, DMM 402 stores data corresponding to image modulator 245 (FIG. 2) characteristics at chosen pixel or screen locations. DMM 402, where applicable, also stores a memory description corresponding to each display pixel or a shared description of groups of display pixels or pixel sectors. Because the description does not change on a frame-by-frame basis, DMM 402 preferably reads the description only once during the display process. DOP 230 then uses the description information to generate image frames. DMM 402, when reading data, uses a set of control registers (not shown) that provide references to the data blocks.

DMM 402 data varies and may include, for illustrative purposes, manufacturing-related information, system configuration information, and user data. Manufacturing-related information may include, for example, a map of locations, usually at assembly time, of defective or weak pixel display bits, correlation data of ideal radial imperfections and of optically distorted projection, and correlation data for alignment points for image modulator 245. System configuration information, through an automatic self-calibration, may include, for example, a registration map having adjustable intensity values for each R, G, and B color component and the color component pixel offset at given locations. DMM 402, where applicable, preferably uses sensor techniques, such as sonar range finding, infrared range finding, or laser range finding to measure distances from a projector (not shown) to different parts of display screen 260. DMM 402 then uses these measurements to mathematically characterize and model a projection display system. DMM 402 thus allows projecting images onto a mathematical approximation of a display screen 260 surface. User data includes user preference information such as brightness, color balance, and picture sharpness that are input by a user during a setup sequence. DMM 402 preferably provides data, either directly or through buffer memory 240, to Geometric Transformation module 404.

In accordance with the present invention, Geometric Transformation 404 advantageously redefines the spatial relationship between pixel points of an image to provide to frame buffer 2400 compensated digital images that, when displayed, exhibit the highest possible image quality. Geometric transformation, also referred to as warping, includes image scaling, rotation, and translation. Geometric Transformation 404 resamples data to produce an affinity output image that can readily map onto FIG. 2 image modulator 245. However, the Geometric Transformation 404 output data points, due to scaling or resampling, may not correspond one-to-one to data points of the image modulator 245 grid. Consequently, DOP 230 includes Post Geometric Transform Filtering 406 to filter the transformed data samples from Geometric Transformation 404 and thereby produce an output pixel value for each data point of image modulator 245. Post Geometric Transform Filtering 406 uses spatial filtering methods to smooth the image and to resample, and thus properly space, the data samples.

Geometric Transformation 404 also improves display image characteristics related to image modulator 245 and the display system. For image modulator 245 screen regions that have more image modulator 245 pixels than screen 260 pixels, Geometric Transformation 404 adjusts the pixel values by a spatial filtering to reduce differences in neighboring pixel values. Consequently, the corresponding image (stored in frame buffer 2400) is smooth and does not contain artifacts. For screen display regions that have fewer image modulator 245 pixels than screen 260 pixels, Geometric Transformation 404 uses edge enhancement filtering to increase differences between neighboring pixel values to pre-compensate for distortion that will be introduced when image projection spreads out neighboring pixels.

Geometric Transformation 404 preferably uses filtering algorithms, such as nearest neighbor, bilinear, cubic convolution, sync filters, or cubic spline interpolation, to process images and thus produce accurate interpolated image pixel values. Further, where multiframe reconstruction requires, Geometric Transformation 404 uses time-varying multiframe filtering methods including deterministic techniques such as projection onto convex sets (POCS), and stochastic techniques such as Bayesian filtering. Based on the computation complexity, Geometric Transformation 404 chooses an appropriate filtering technique.

Geometric Transformation 404 can improve image deficiencies related to the screen 260 environment. Geometric Transformation 404 performs a spatial projection which warps the image to compensate for a curved display screen 260 as is usually used in front projection theater systems, and subsequently uses bitstream information to improve the image. For example, if it can acquire the depth of moving objects, Geometric Transformation 404 can reduce the distorted motions at the edges of a curved screen 260. Geometric Transformation 404 constructs an optical flow field of the moving objects along with the object distance information. Geometric Transformation 404 then uses motion adaptive filtering to construct a sequence of output frames that position the objects at the proper spatial coordinates in the time domain. Geometric Transformation 404 thus, during projection on a curved screen 260, conveys the proper motion of all objects in a scene. Geometric Transformation 404 also works in conjunction with an optical correction to improve distortions resulting from the different focal distances from a projector (not shown) to different parts of screen 260. Geometric Transformation 404 uses range finding techniques (discussed above) to construct a model of the screen 260 environment and then uses the information from the model and the optical system to mathematically construct a formula to compensate for image distortions. Geometric Transformation 404, to correct a warping distortion produced by an optical system, uses the same mathematical basis for a flat screen geometric transformation to apply to a curved screen.

The transfer function for the path from the image modulator to the display screen changes if the display screen is curved. The curve of the display screen becomes part of the transfer function of the display system. The geometric transformation can incorporate the curved display screen contribution to the transfer function and compensate accordingly. The benefit of incorporating the screen curvature in the transfer function is that the geometric transformation operation only needs to be performed once to compensate for both the system distortions and screen curvature.

Geometric Transformation 404 uses special processing, similar to the curved screen 260 processing, for various head-mounted displays (HMDs). A HMD is a display unit combined with a helmet or glasses that a user wears, and usually includes two image modulators 245, one for the right eye and one for the left eye. HMDs are useful for a single viewer and, because of their physically smaller area, they typically display high quality images.

Geometric Transformation 404, without considering motion adaptive filtering, treats image spatial projection with warping onto a curved screen 260 in the context of 3D graphics. Geometric Transformation 404 considers a display image frame as a 2D texture and considers a curved surface as a 3D surface. Geometric Transformation 404 then maps the 2D texture onto a surface that is the mathematical inverse of the curved screen 260. Geometric Transformation 404 thus pre-corrects the image frame so that, when projected, the mapped image will have filtered out the distortions associated with a curved screen 260. Geometric Transformation 404 preferably uses techniques such as anisotropic filtering to assure that the best texture is used in generating output pixels. Geometric Transformation 404 also preferably uses filtering techniques such as sync filters, Wiener deconvolution, and POCS, and/or other multipass filtering techniques to filter the images off-line and then output the filtered images onto a film recorder. Geometric Transformation 404 preferably allows more computationally-intensive image operations to be performed off-line.

Geometric Transformation 404 processes video as 3D texture mapping, preferably using systems that accommodate multiple textures in images. For example, Geometric Transformation 404 can use high quality texturing techniques such as bump mapping and displacement mapping which apply multiple texture maps to an image. As another example, Geometric Transformation 404, to model the graininess inherent in film, may apply multi-surface texturing to give video a more film-like appearance. Geometric Transformation 404 can allow a user to select the graininess modeling feature as part of the setup procedure, similar to selecting room effects such as "Hall," "Stadium," etc., in an audio playback option.

Geometric Transformation 404 can process digital data from a multi-camera system to improve the focus, and thereby provide higher quality images for image modulator 245. Geometric Transformation 404 evaluates which of the multiple camera views provides the best focus for an object and then reconstructs the object in proper perspective. Geometric Transformation 404 then combines the multiple camera views on a regional or object basis to produce output images. Multiple camera views can also be used for multi-frame image reconstruction.

Geometric Transformation 404 can also use multi-camera bitstream information included in the image data to determine the object depth of a scene and to construct a 3D model of the shape and motion pattern of the moving objects. Geometric Transformation 404 then uses the same bitstream information to solve problems related to a curved screen 260 projection to achieve proper object motion completely across the screen 260.

Geometric Transformation 404 can also improve auto stereoscopic 3D display systems in which multiple camera channels present a binocular display and each of a viewer's eye sees a different monocular view of a scene. The video input from multiple cameras, combined with knowledge of the position of the camera, allow a 3D display to be generated. The positional information is used during the display process so the viewer will see the camera views from the proper right and left eye viewpoints. In another system, supplemental bitstream information can explicitly indicate objects in the video, as well as the depth and motion of these objects. The GT 404 can use the positional camera information as well as explicit object information in order to perform the transforms for the display output data. Geometric Transformation 404 can construct each of the monocular views in accordance with the focus and motion adaptive filtering techniques described above.

The techniques for matching viewer positional information and multiple camera views can be used for multiple screen entertainment systems. These entertainment systems may involve some combination of moving and stationary screens as well as moving or stationary viewers. One example application is a theme park ride where the viewer sees multiple screens while he is moved along the ride path. The ride path may either be pre determined or may be interactively determined.

For multiple video input systems, the Geometric Transform module can be used for performing special effects and real time transitions between video streams to improve the user interface. For example, when changing channels, instead of abruptly changing from one channel to another, the geometric transform module can fade one channel and blend it with the new channel. Fades and blends typically keep the video pixels at the current locations and perform weightings to increase or decrease the intensity of the pixel values. This is also used for menu overlays for such features as on line program guides and user setup menus. The Geometric Transform module can also perform more advanced transitions such as wipes or warps. These more advanced transitions involve warping the video image by changing the spatial coordinates of the video image. One technique for performing these effects is to use video as a texture map and to apply the video texture map in real time to the changing display map.

GT 404 can also be used to process an image-key meta data stream, which is a hybrid decoding type for a bitstream of combined video and synthetic data. This image key information technique allows the enhanced decoding system of the invention to generate enhanced outputs for environments where standard MPEG data may not be sufficient. The image key information records the positional information and environmental information for the "key" area in the video image. The meta data stream includes an additional description of the same key area of the image. This description is preferably generated synthetically. For example, the invention can encode a hockey game such that the encoding system tracks the hockey puck and an image key meta data stream is included in the bitstream. The enhanced decoder later uses the same key meta data stream to display an enhanced hockey puck that can be seen more easily by viewers. The invention also allows a user to vary the puck highlighting to suit the user's viewing preferences and match the user's viewing environment. A fixed puck highlighting without an option to vary the highlighting may be objectionable to viewers.

Replacement of one object with another object in the video stream, which can be used for placement of products as advertisements, is another example of how the invention can utilize image key meta data. For example, the invention allows a broadcaster to appropriately broadcast an image of a can of soda displaying a label of either Coke® or Pepsi® because the invention allows broadcasting the soda can along with a key meta data stream that represents the label. The invention, where appropriate, allows the desired label to be superimposed on the soda can. Further, the invention can use viewer profile information to determine which product (here, Coke or Pepsi) is to be displayed.

Other image key information may include object information such as the depth of the object in a field. The invention uses this type of information to project images on a curved surface, such as in a digital panoramic system. The invention uses the depth information to adjust output pixels and thus varies the spatial position of an object to correct for the curved surface. Because adjusting the output pixels can cause complications, such as how these adjustments will affect the surrounding pixels, the invention, via the bitstream encoder, uses a fencing technique to lessen the impact of these adjustments. The invention marks the macroblocks that are part of the object in the video portion of the stream as "off limits," that is, these macroblocks are not to be used for motion vector prediction between frames. The invention thus allows substituting or modifying the objects or macroblocks without affecting the surrounding blocks. The invention can also use supplemental data streams in 3D camera systems that provide supplemental information, such as, what is behind the object being keyed, which is often useful for DOP 230 in the pipeline and is passed along in the pipeline.

Among other features, the ability of GT 404 to combine video data along with synthetic data and optimize it for a display system distinguishes it from prior art systems. The operations of the GT 404 optionally can be implemented as part of a 3D graphics pipeline using traditional texture mapping techniques. Also, synthetic image data can be mapped onto a portion of the video frame, where the synthetic image can be represented by a 2D or 3D data set.

Color and Spatial Gamma Correction 410 converts YUV to RGB color space and determines the intensity values for each of the R, G, and B color components. Those skilled in the art will recognize that a color space conversion is not necessary if it has been done previously or if the image is otherwise already in the RGB color space. Color and Spatial Gamma Correction 410 preferably uses a look-up table, in which each of the R, G, and B color components has values corresponding to color intensities, to translate image colors. Each R, G, and B intensity value represents an index into the look-up table, and the table provides the output (or "translated") value. Color and Spatial Gamma Correction 410 independently processes each R, G, or B color component. Color and Spatial Gamma Correction 410 maps each color component based both on a combination of individual RGB values and on RGB values of surrounding pixels. For example, if FIG. 2 image modulator 245 requires a certain brightness for an identified area on display screen 260, then Color and Spatial Gamma Correction 410 may use the RGB values of the pixels in the identified area and of the pixels in the neighboring area. Color and Spatial Gamma Correction 410 uses mathematical calculations, or preferably a color look-up table (CLUT), to provide the RGB values for the desired image outputs. Color and Spatial Gamma Correction 410 prefers using a CLUT instead of mathematical calculations because a CLUT allows a non-linear mapping of the input RGB values to the translated (output) RGB values. A non-linear mapping enables input colors represented by RGB values to be adjusted (emphasized or de-emphasized) during the mapping process, which is useful for crosstalk suppression and for compensation of shortcomings in a color gamut of image modulator 245. Color and Spatial Gamma Correction 410, to realize a non-linear relationship, uses a translation table represented by a number of bits that is larger than the number of data input bits. For example, if eight bit represents 256 (=$2^8$) color component intensity values, then Color and Spatial Gamma Correction 410 uses, as another example, 10 bits to represent 1024 (=$2^{10}$) translated values. A system manufacturer maps 256 values to 1024 translated values.

TGP 412 assures that the time related representation of an image is as accurate as possible. TGP 412 thus, based on a previous frame value and a known transfer function of the display modulation system, adjusts its output values to provide a desired output value during a desired frame. TGP 412 independently processes each R, G, or B color component and compensates for modulating transition characteristics that, due to the nature of an LCD image modulator 245, are not purely digital. TGP 412 also overdrives the LCD image modulator 245 to compensate for the LCD material characteristics, so that the desired output can be achieved more quickly. Consequently, TGP 412 overcomes the video quality limitation of prior art systems having materials that produce blurred outputs. TGP 412 can also reduce the cost of the display system because the materials used for image modulation in prior art systems that provide faster image response are usually expensive. TGP 412 is described in detail with reference to FIGS. 6 and 7.

Reverse Super-Resolution (RSR) 414 performs a superset of the frame rate conversion process for converting between disparate input and output frame rates, and can improve display quality when intended display images have a higher apparent resolution than can be supported by the number of pixels of image modulator 245. RSR 414 simulates higher resolution outputs by sequencing lower resolution images at higher frame rates. Thus, for example, RSR 414, block by block, spatially filters one frame in a video sequence having a transfer rate of X frame per second (fps) to Y number of RSR frames having a transfer rate of Z fps, where Z=X×Y. RSR 414 then shifts by the same pixel (or pixel fraction) amount the pixel matrix representing each RSR image block. For example, because there are Y RSR frames, RSR 414 shifts the pixel matrix block Y times, once for each RSR frame, and each shift is by the same pixel (or pixel fraction) amount. The number of pixel fractions to be shifted depends on the physical characteristics of the display system and of image modulator 245. Where a system adjusts the position of the viewed image, the shift fraction corresponds to the physical movement of the viewed displayed image. Where there is no actual movement of the displayed image, the fractional adjustment is based on the physical nature of the display device such as the pixel size relative to the size of image modulator 245 and to the projection characteristics of the system.

RSR 414 then produces each RSR frame with a motion-compensated weighted filtered center so that the center of the input image for each RSR frame is maintained such that no motion artifacts are introduced. A pixel-matrix weighted filtered center is the center of a pixel matrix taking account of filter weights in a filter transfer function. Filter weights, varying depending on the filter characteristics, are the values (usually of multiplications and additions) which are combined with the input pixel values to produce the filtered image output. A filter transfer function uses filter weights to transform an input image to an output image. Output image pixels, based on a transfer function, can be adjusted to move the corresponding image. RSR 414 preferably uses image blocks having 8×8 to 256×256 pixels where each block has uniquely processed motion information. For static images, RSR 414 produces a sequence of frame-rate-adjusted output frames that are based on the difference between the input and the output frame rate. For motion pictures, RSR 414, at the time of the output frame, portrays the intermediate position of the image and compensates for the image motion. With increased processing, each pixel or sub-pixel will have its motion information processed uniquely. RSR 414 is further illustrated with reference to FIGS. 8 and 9.

Based on the DMM information relating to the projection system characteristics, the GT 404 determines the extent and need to perform the image transformation. The various processing stages of the GT 404 are able to use blocks of the original image in order to perform the processing and create the new output blocks. A variety of sampling techniques are used on the output of the DIP to produce the data for the DOP. The DOP generates the pre-compensated data for the image modulator. Geometric transformation of digital images is a sampling process and is susceptible to aliasing artifacts. Simple sampling techniques such as point sampling are not sufficient to avoid aliasing. Instead, techniques such as area sampling, supersampling, adaptive supersampling, stochastic sampling, poisson sampling, jittered sampling, point diffusion sampling and adaptive stochastic sampling. Other more advanced convolution techniques are also used in sampling and even after sophisticated sampling is used, post sample filtering is required.

Display Modulator (DM) 420 preferably receives DOP 230 (processed) output data, and controls sending of that data to image modulator 245. DM 420, to prevent tearing within an image frame, may include control for timing updates with respect to the display timing. DM 420 outputs may be analog but preferably are digital and include separate data and control signals for each R, G, and B color component. For TFT displays that include column drivers, DM 420 outputs, for example, can be on one or two 24-bit digital busses that drive a raster scan. Alternatively, DM 420 may use voltage or frequency modulation techniques for outputs to drive image modulator 245. DM 420 outputs, for a flat panel display, include row and column drivers, and for each active matrix TFT, passive matrix LCD display, or other display type that requires them, includes voltage level specifications. Prior to modulating images, DM 420 determines the simplest way, the frequency, and the values represent the data to be written to image modulator 245. DM 420 uses TGP 412 and RSR 414, which include both compensation for the time response associated with image modulator 245 and an algorithm that increases the display update rate (or refresh rate), to increase the perceived resolution of image modulator 245.

Figure 5:
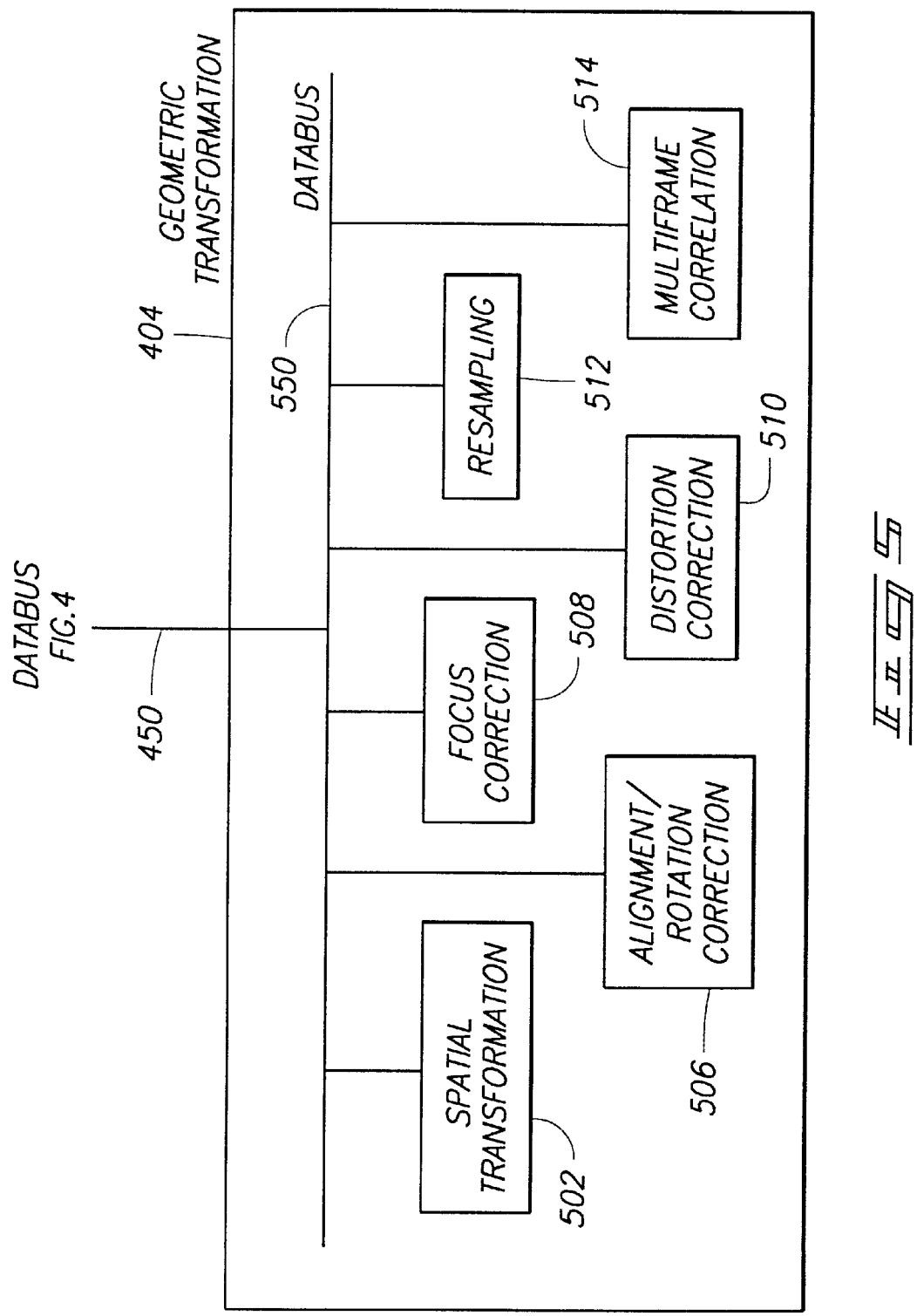
FIG. 5 is a block diagram for one embodiment of the FIG. 4 Transformation 404, in accordance with the present invention.

FIG. 5 is block diagram of Geometric Transformation 404 of FIG. 4 and includes image processing modules Spatial Transformation 502, Alignment and Rotation Correction 506, Focus Correction 508, Distortion Correction 510, Resampling 512, and Multiframe Correlation 514, all interconnect via a common databus 550. These processing modules, although they are shown as separate blocks, can be a single programmable processor performing the functions of the various modules.

The general mapping function can relate the output coordinate system to that of the input. Both the flatness of the screen and the distortion produced by the optics of the system define the transfer function of system 200. The geometric transform 404 hardware or software of system 200 takes this transfer function and effectively inverts it so that the processed input video data is written to the image modulator so that the transfer and inverse transfer functions counter each other and the display at the screen most accurately portrays the input data. An important aspect of being able to generate the best data values for the image modulator 245 is the ability to apply super-resolution techniques to the input data so that higher resolution intermediate images can be used for the generation of the image modulator data.

In the FIG. 5 embodiment, Spatial Transformation 502 redefines the spatial relationship between image pixel points. Spatial Transformation 502, for example, in an X–Y alignment in a projection system with three image modulators 245, allows each image modulator 245 to have extra pixel rows and columns. Spatial Transformation 502 then digitally adjusts the image pixels in the X–Y plane and writes the adjusted pixel data to image modulators 245. For example, if the pixel adjustment is by an integer, Spatial Transformation 502 shifts the old imaging pixel address by the integer number of pixels to adjust. However, if the adjustment is a non-integer then Spatial Transformation 502 resamples the image with a weighted filtering algorithm to acquire new pixel values. Spatial Transformation 502 also deals with one-dimensional skew, tangential symmetry, aspect angle, and scale related distortions of image modulator 245. Spatial Transformation 502 uses resampling and weighted filtering algorithms to correct for such distortions on a pixel line by pixel line basis. Spatial Transformation 502 can perform texture mapping as in a traditional 3D rendering process.

Alignment/Rotation Correction 506 deals with two dimensional skew, tangential symmetry, aspect angle, and scale related distortions of image modulator 245. Alignment/Rotation Correction 506, for each R, G, and B color component, uses resampling and weighted filtering to reposition pixels in the both horizontal and vertical directions so that, when output, each color component is positioned in the proper locations across the entire image. Alignment/Rotation Correction 506 also repositions pixels to rotate display images. Alignment/Rotation Correction 506, to correct rotational misalignment for three image modulators 245 or geometric distortion from lenses, performs a geometric transformation to pre-compensate the images.

Focus Correction 508 improves non-uniform defocus, including defocus introduced by image modulator 245 optics. Focus Correction 508, to account for focus problems of display screen 260, preferably filters the image to pre-compensate the digital data representing the image. If a display screen 260 area has more image modulator 245 pixels than display screen 260 pixels, then Focus Correction 508, on a single frame basis, uses noise filtering techniques to apply linear filters, nonlinear filters, and adaptive filters. Focus Correction 508 additionally uses techniques based on POCS or other adaptive filtering techniques to pre-compensate for anticipated focus blurring. In contrast, if the display screen 260 area has fewer image modulator 245 pixels than screen 260 pixels, Focus Correction 508 uses convolution techniques or reverse filtering techniques to perform edge enhancements to pre-compensate for the pixels being spread out and the image being blurred during projection. The spatial spread of the image due to the display system is characterized as the display system Point Spread Function (PSF).

Distortion Correction 510 corrects image distortion, including keystone effects. Distortion Correction 510 provides each image with a scan line having a different scale factor to precompensate for projection distance differences. Distortion Correction 510, starting from the upper portion of the image, filters the image by permitting the image to use fewer pixels on image modulator 245, so that, when projected, images on screen 260 will be proportioned properly.

Distortion Correction 510 also corrects for radial distortion introduced by lens systems. In regions where radial distortion increases the pixel density of display screen 260, Distortion Correction 510 uses a spatial filter to reduce any differences between neighboring pixel values. Consequently, the corresponding image is smooth and does not contain artifacts, including high frequency artifacts. For screen display 260 regions that have fewer pixels than display screen 260 pixels, Distortion Correction 510 uses a filtering technique to perform edge enhancements which increase differences between neighboring pixel values. This pre-compensates for the PSF distortion which will be introduced during display where neighboring pixels are spread out. Consequently, the display process smooths out images that would have had sharp edges to have a more uniform appearance. Distortion Correction 510 preferably acquires specific distortion patterns from DMM 402.

Resampling 512 translates the pixel values from high resolution grids to new pixel values on image modulator 245 grids. Multiframe Correlation 514 improves multiple frame display quality. For both increased and decreased pixel representations, Multiframe Correlation 514 uses algorithms such as Wiener deconvolution to exploit the temporal correlation between frames. Multiframe Correlation 514 uses multiframe techniques that process more than one input image frame to construct an optical flow field, which is further processed to construct output frames. IR 318 can provide frame inputs to Multiframe Correlation 514. Alternatively, these frame inputs may be part of the compressed data input to Compressed Input Control 312. Multiframe Correlation 514 can use Bayesian filtering or POCS techniques to extract multiple frame information and motion vectors showing relationships between frames from a compressed bitstream.

Multiframe Correlation 514 also converts an input frame rate to an output frame rate, for example, from 24 frames per second (fps) to 60 fps. Multiframe Correlation 514, thus, from the sequence of 24 input frames, generates 60 unique and distinct output frames wherein all moving objects are motion-compensated so that, at the time when they are displayed, they are at the proper spatial coordinates. Information for generating proper output frames results from the input frame, motion estimation information, and object motion prediction. Motion estimation information is either part of the MPEG-2 input bitstream or generated by Motion Estimator 3180 during image input processing.

Figure 6:
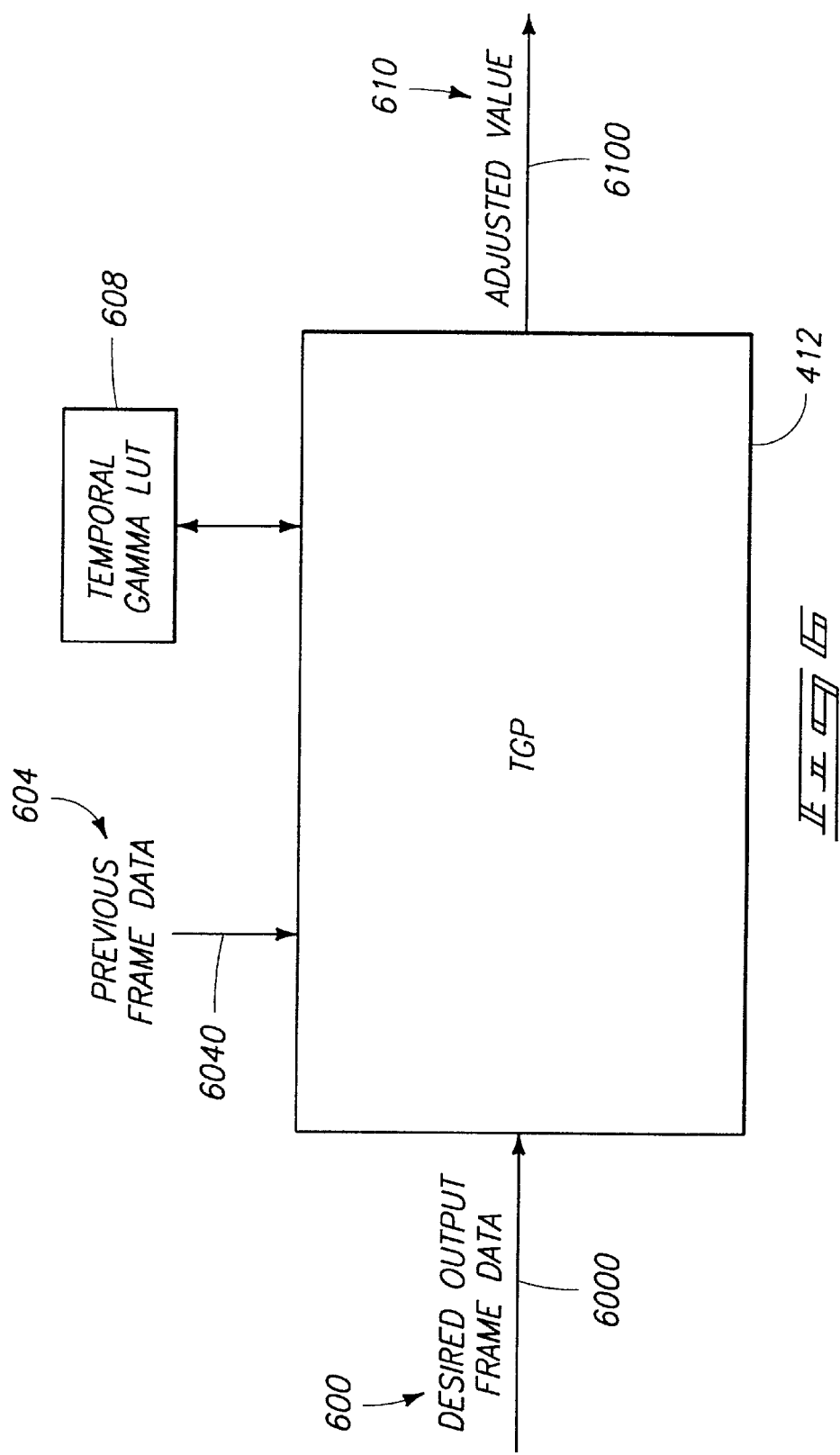
FIG. 6 is a diagram that illustrates the operation of the FIG. 4 TGP 412, in accordance with one embodiment of the present invention.

FIG. 6 illustrates the operation of FIG. 4 TGP 412, which receives desired output frame data 600 on line 6000 and previous frame data 604 on line 6040, and outputs value 610 on line 6100. In the preferred embodiment, lines 6000, 6040 and 6100 are part of databus 450 (FIG. 4). Desired output frame data 600, previous frame data 604, and adjusted output value 610 are preferably in R, G, and B color component values. Desired output frame 600 preferably has been sampled by Resampling 512 (FIG. 5) and is provided from Geometric transformation 404, Post GT Filtering 406 and Color/Spatial Gamma Correction 410. Previous frame data 604 corresponds to the last frame data of desired output frame 600 that was output to image modulator 245. Previous frame data 604 is preferably stored in memory buffer 240 because previous frame data 604 cannot be efficiently read from image modulator 245, which does not provide a reliable or fast read path. TGP 412, processing each R, G, and B color component independently for each pixel, uses previous frame data 604 to select a look-up table in temporal look-up table (TG LUT) 608, and from that selected table uses desired frame data 600 to provide adjusted value 610.

Figure 7:
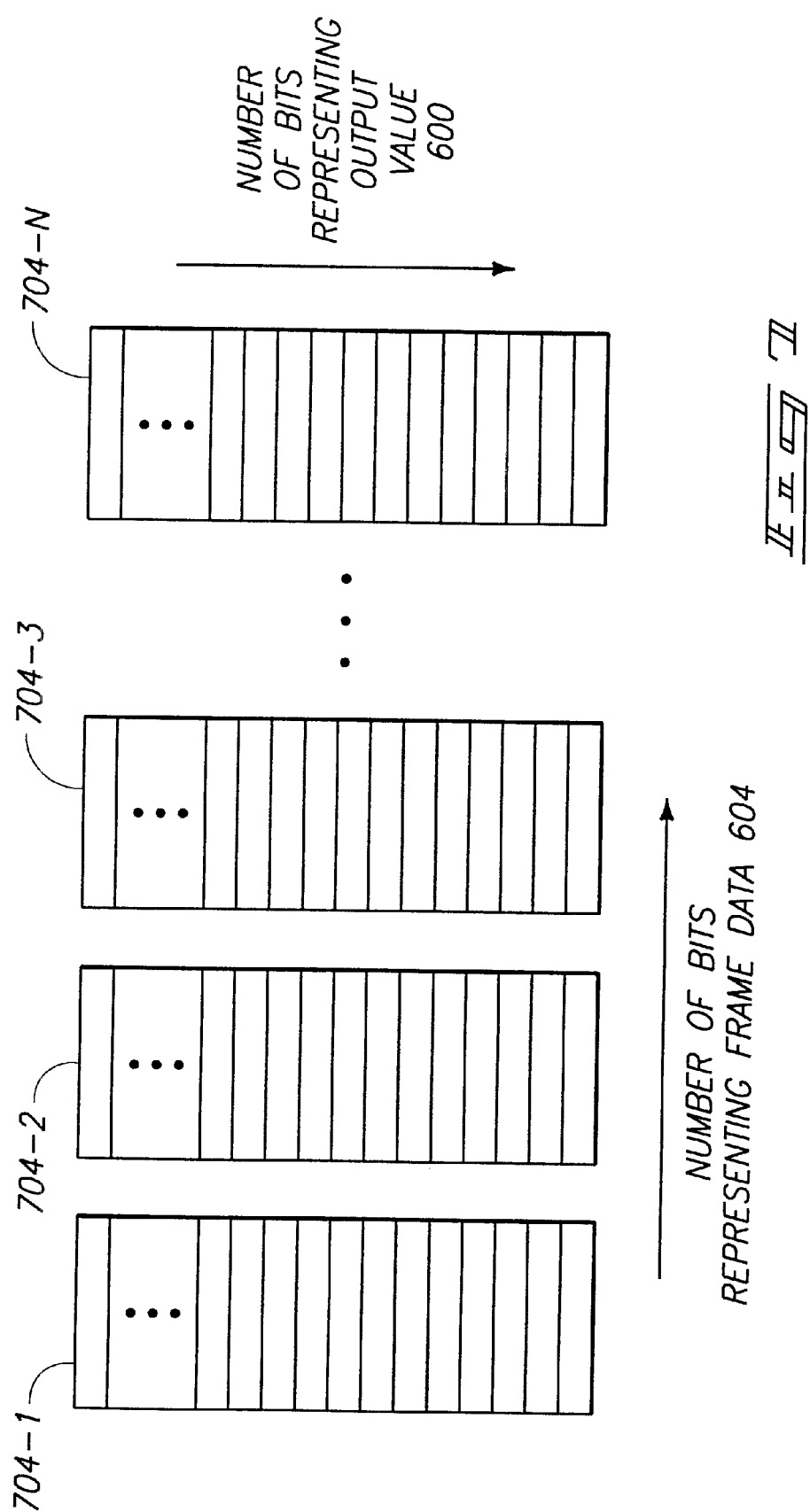
FIG. 7 is a diagram that illustrates the operation of the FIG. 6 TG LUT 608, in accordance with one embodiment of the present invention.

FIG. 7 illustrates the operation of FIG. 6 TG LUT 608, which includes translation tables 704–1 to 704–N. The number of bits representing desired output value 600 determines the depth of a table 704, that is, the number of (Red, Green, or Blue) color component intensities a table 704 can store. The number of bits representing previous frame data 604 provides the number of tables 704. Consequently, if for example, 8 bits represent desired output data 600, then each table 704 can store 256 ($=2^8$) intensity values for each R, G, and B color component. Similarly, if another 8 bits represent previous frame data 604, then TGP 412 includes 256 tables 704 (from 704–1 to 704–256). However, TGP 412, when applicable, as when extensive mapping is not required, uses only the upper significant bits of previous frame data 604 to reduce the number of tables 704. For example, if previous frame data 604 uses only five most significant bits, then TGP 412 includes only 32 ($=2^5$) tables 704. TGP 412, when selecting a table 704, performs both the traditional spatial gamma correction and the temporal gamma correction.

The intensity value for each color component in each table 704 may contain more bits than the number of input data bits. For example 8 bits may represent 256 ($=2^8$) desired output values 600 while 10 bits represent 1024 ($=2^{10}$) look-up table entries in table 704. Consequently, a system manufacturer can provide a mapping table to map from 256 values to 1024 values.

Figure 9:
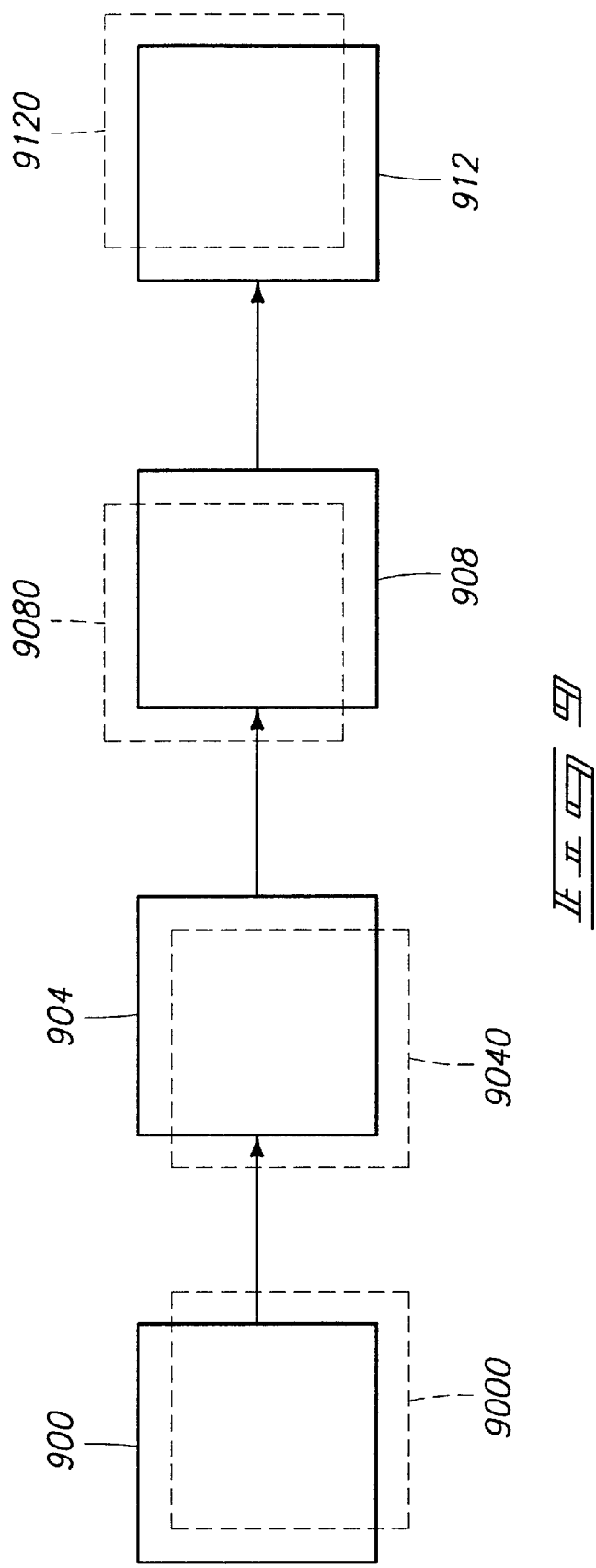
FIG. 9 is a diagram that illustrates reverse super-resolution operating on an image, in accordance with one embodiment of the present invention.

FIG. 8 and FIG. 9 illustrate the function of RSR 414 operating on a video sequence containing images that have a spatial resolution four times higher than can be supported by the number of pixels of image modulator 245. FIG. 8 shows, for example, a video image 800 having an 8×8 pixel resolution and a video image 804 of image modulator 245 (FIG. 2) having a 4×4 pixel resolution. For illustrative purposes the video sequence transfer rate is 24 fps. RSR 414 filters 24 fps frames into 96 (4×24) fps images, and thus uses the higher spatial resolution at a higher temporal display rate, although each frame has a lower spatial resolution. FIG. 9 shows an image frame 900 transitioned into frames 904, 908, and 912. However, to achieve a higher apparent resolution output image, RSR 414, block by block, spatially filters frames 900, 904, 908, and 912 into transitional frames 9000, 9040, 9080, and 9120, respectively. RSR 414, in generating frames 9000, 9040, 9080, and 9120, keeps the pixel matrix weighted filtered center of each frame 900, 904, 908, and 912 constant or such that motion artifacts are not generated. RSR 414 then filters frame 900 to frame 9000, that is, RSR 414 resamples each frame 900 block such that each frame 900 block output pixel matrix is shifted, for example, half a pixel to the bottom and half a pixel to the right. RSR 414 thus causes the effective center, or the weighted and spatially filtered center, of each pixel in a frame 900 block to shift to the center of what becomes the upper left quadrant of that pixel. Spatially filtering each block by block (versus filtering an entire frame at once) allows the filter coefficients to more accurately represent the desired block outputs. Combining the block outputs produces the new output frame. Further, spatially filtering each frame 900 to frame 9000 causes the viewable area of frame 9000 to be one pixel less on each edge than that of frame 900.

As frame 900 is transitioned to frame 904, RSR 414 filters frame 904 to frame 9040 (again on a block by block basis). Consequently, the frame 904 output pixel matrix is shifted half a pixel to the left and half a pixel to the bottom (the weighted center of each pixel shifts to that pixel's upper right quadrant). Similarly, as frame 904 is transitioned to frame 908, RSR 414 filters frame 908 to frame 9080, and as frame 908 is transitioned to frame 912, RSR 414 filters frame 912 to frame 9120. As a result, the frame 908 output pixel matrix is shifted half a pixel to the left and half a pixel to the top (the weighted center of each pixel shifts to that pixel's lower right quadrant), and the frame 912 output pixel matrix is shifted half a pixel to the right and half a pixel to the top (the weighted center of each pixel shifts to that pixel's lower left quadrant). RSR 414 can substitute any "pixel fraction" for "half a pixel" in the above discussion. The pixel fraction is determined by a system designer considering the projection path from image modulator 245 to display screen 260 and/or the pixel characteristics such as the grid spacing of the pixels versus the physical size of image modulator 245. In this preferred embodiment, shifting and filtering images and increasing the display rate produces higher resolution display images.

In a second embodiment, the invention, instead of just shifting the pixel matrix, can physically move the viewed images at the display screen refresh rate, by moving either the direct screen display device 260 or image modulator 245. Where the image modulator 245 is used in conjunction with a projector, the invention moves image modulator 245. The invention uses any of several techniques including Piezo electronics or micromachines to move modulator 245. For example, the invention uses Piezo electronics to vibrate image modulator 245, and thereby shifts modulator 245 in the X and Y directions. Assuming image modulator 245 and the pixel matrix representing an image are both square, Piezo electronics, according to the invention, uses the following equation to move image modulator 245:

$$D_{m=Dd}*(S/N)$$

where $D_m$ is the distance in inch to move image modulator 245, $D_d$ is the desired distance in a unit of a pixel size to move the image pixel matrix, S is the size in inches of an image modulator 245 side, and N is the number of pixels per side of the image pixel matrix. Consequently, if image modulator 245 is one inch per side and has 500 pixels per side, then Piezo electronics will move image modulator 245 by 0.0005 (=0.25*(1/500)) inch in order to move the display image one quarter (0.25) of a pixel. In this example, sequentially moving the display image a quarter of a pixel generates four times as many pixel locations. Further, sequentially displaying images at four times the refresh rate and shifting image modulator 245 by 0.0005 inch produces a four times greater resolution for the display images. This increased resolution results from the four-times increase in the display rate, the generation of images transferred to image modulator 245, and the shifting of image modulator 245. Image modulator 245, while being moved to shift an image pixel matrix, uses data in the four frames 900, 904, 908, and 912 to sample pixels for each image location of an output image, and from the four corresponding locations from the four frames 900, 904, 908, and 912, produces one location to display. Moving image 245 is in repeated cycles. Further, during each cycle, image modulator 245 uses a corresponding sample from each of the four frames 900, 904, 908, and 912.

Alternatively, the invention can use other techniques that allow the illusion of moving modulator 245 without physically moving any parts. For example, the invention can use more than one LCD mirror to reflect the image through the display projection system where each mirror has a slightly different projection angle. The invention uses the LCD mirrors to create a sequence of projected images with slightly different positions. The invention can also use lenticular lens, LCD mirror, or multi-layered micro display technologies to move the viewed image without moving image modulator 245. In accordance with the invention, RSR 414 produces, for static images, an output which is stable to a viewer because human vision interpolates multiple images to form one continuous image view.

However, for moving images, RSR 414 outputs would contain unwanted motion artifacts. Consequently, to prevent these artifacts, RSR 414 uses motion-adaptive filters, including median filters, that include motion tracking to filter each block constituting each image frame (900, 904, etc.). Motion-adaptive filtering accounts for positions of moving objects between intermediate frames created by RSR 414. For example, an object may be moving along an X axis from a position 6 in frame i to a position 10 in frame k. If RSR 414 creates an intermediate frame j, then the moving object will be positioned at location 8 in frame j, which is half way between location 6 in frame i and location 10 in frame k. Similarly, if three intermediate frames j1, j2, and j3 were produced, the object would be positioned at locations 7, 8, and 9 in frames j1, j2, and j3, respectively. RSR 414, used in combination with motion-adaptive filtering, weights the RSR frames and compensates for motions between frames.

RSR 414 also uses the block-based motion estimation from the MPEG-2 motion vectors or from Motion Estimator 3180 to track motion in the image. RSR 414 first identifies the motion blocks of the objects within an image, then allows successive output frames to utilize the image object motion information and to move the center weighting for the corresponding pixels to correlate to the object motion. RSR 414 also uses multiple input frames or fields to track the trajectory and velocity of moving objects and thereby predicts the object spatial position in a frame. As a result, RSR 414 greatly reduces or even eliminates motion artifacts. RSR 414 thus can produce images having higher resolution than can be supported by the number of pixels of image modulator 245, and provide a high resolution system without incurring increased cost as is usually found in prior art high resolution systems.

When coded bitstream data is received, RSR 414 can extract the motion tracking information directly from the bitstream, which preferably includes the data to discern which blocks contain moving objects and the object movement patterns. Alternatively, RSR 414 can extract the same motion tracking information from post-decoded (or decompressed) frames. RSR 414 then provides the motion tracking information to the filtering algorithms. RSR 414 can improve FEDs and the class of displays defined as those in which each pixel is made up of a matrix of emitting elements. For example, RSR 414 combines the FED mesh cell configuration and its address control to perform RSR and, from high resolution images, sequences a high resolution output using a FED that has a lower number of addressable pixels. RSR 414 uses the same techniques for generating the spatially filtered RSR frames to determine the sequence of lower resolution images. RSR 414 then, taking advantage of the sub-pixel addressing within a pixel that is unique to the microtips and mesh structure of the FED, writes the sequence of the frames within the FED sub pixel addressing. The resolution of FEDs is defined as the ability to individually address a pixel. According to the invention, FEDs can be designed with an internal function to adjust the mesh cell emitter positions for data already stored in the pixels. In this way the position of the image is moved without a new image being loaded into the pixels. Sequentially modulating images within the FED mesh structure constructs a display image that has higher resolution than the addressable resolution of the FED display would otherwise allow.

Figure 10:
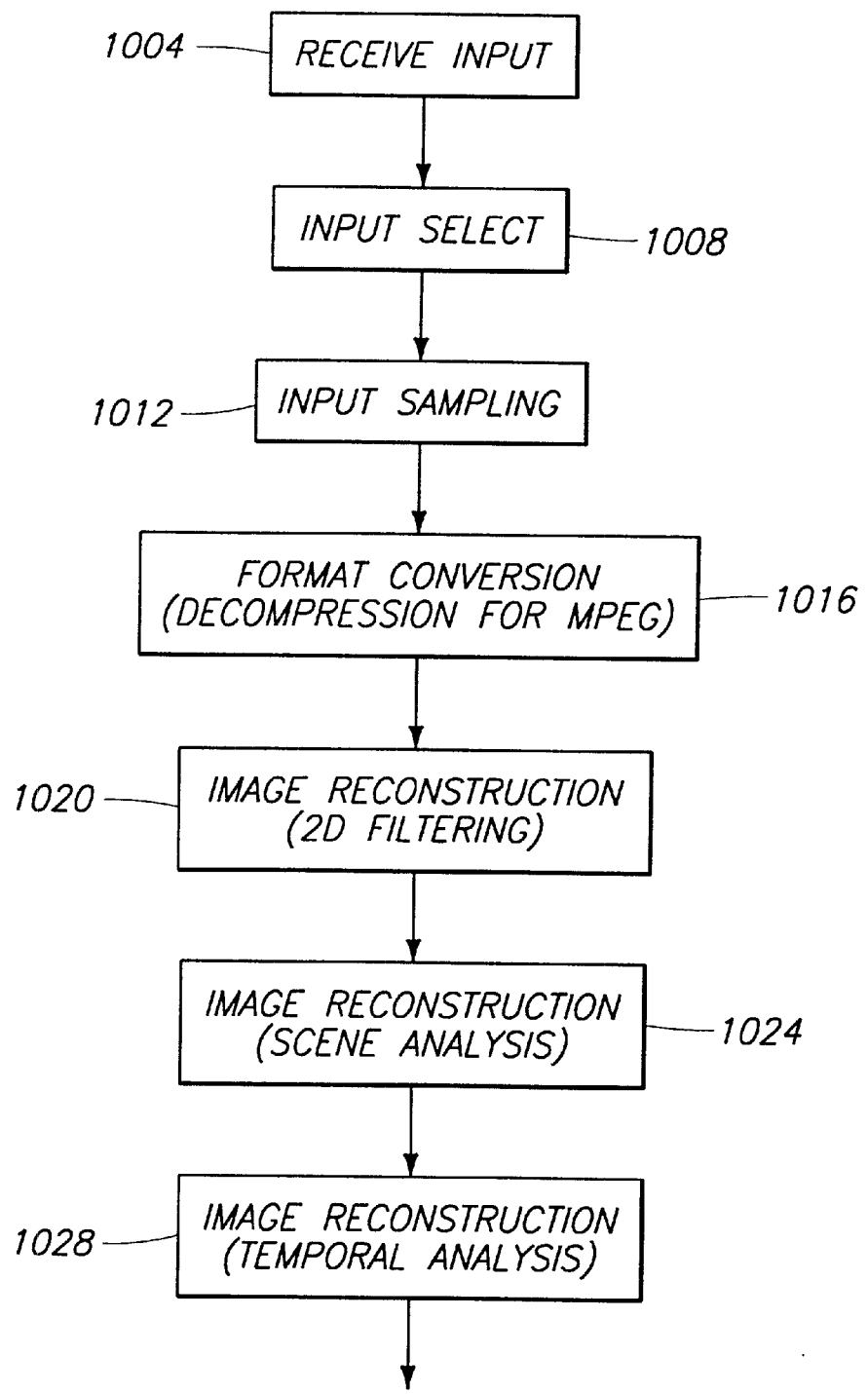
FIG. 10 is a flowchart of method steps illustrating DIP 210's image processing, in accordance with one embodiment of the present invention.

FIG. 10 is a flowchart illustrating DIP 210's image processing steps in selecting and reconstructing images. In these steps, DIP 210, where applicable, preferably creates a database to store motion information for later use by DOP 230. In step 1004, system 200, via connector 300 of DIP 210, receives input images. In step 1008, a microcontroller preferably selects one or more input images and provides each image to appropriate image processing modules Analog Input Control 302, Digital Input Control 304, and Compressed Input Control 312. Each processing module 302, 304, and 312, in step 1012, samples, and thereby recovers, the input images. Analog Input Control 302 may discard unnecessary or repeated input fields.

Compressed Input Control 312, via Bitstream Engine 3125, analyzes the compressed input streams and selects one or more picture streams for analysis and processing. For quality picture display, Bitstream Engine 3125 records the motion information from the bitstream for use in the image reconstruction steps 1020, 1024, and 1028, and by the DOP 230. Bitstream Engine 3125, based on a quality trade-off decision, can select a single picture or decode multiple pictures. This is because system 200 may not have the compute power required to process multiple input streams at full quality. If multiple pictures are to be displayed simultaneously, each picture will only be a portion of the total display output and thus can cause lower visual display quality than if a single picture were used for the full output. Bitstream Engine 3125, while sampling a compressed stream, may extract multiple picture streams, and, if required, reduce the complexity of the multiple picture streams to be processed.

In step 1016, each processing module 302, 304, and 312 preferably formats the images and stores them in buffer 240. In this step 1016, Decompression Engine 3120 preferably uses the MPEG-2 decompression steps to convert the compressed bitstream into a decompressed and decoded picture. Decompression Engine 3120 can simultaneously decompress more than one compressed picture stream for multiple picture displays including advanced picture-in-picture displays and multi-camera systems. For input data that includes layered coding information, where there is a base layer and an enhancement layer of coded information, Decompression Engine 3120 can decode both layers for use by the Image Reconstruction 318.

Image Reconstruction 318, in step 1020, spatially filters each image frame to reconstruct 2D images. Spatial filtering includes various techniques for noise reduction so that the filtered image does not include artifacts that were not part of the original image. Filtering is preferably applied across the entire input image based on the data values. However, filtering can use additional information, such as spatial position of the decoded macroblocks, that is provided by the Bitstream Engine 3125 in cases where, for example, the MPEG-2 data has been decompressed by Decompression Engine 3120. This positional information allows the filter to reduce or eliminate artifacts from boundary edges from the decoded macroblocks while performing the more traditional spatial filtering on the other portions of the image.

In step 1024, Image Reconstruction 318 performs scene analysis on each of the spatially filtered input images. For input images that were not MPEG-2 data, Image Reconstruction 318 analyzes and arranges the scene data as groups of pixels for use by the Motion Estimator 3180. For MPEG-2 data, Image Reconstruction 318 can combine the motion vector information, which is usually block based, with the decoded and filtered images to recognize image objects. Image Reconstruction 318 can apply a filter, such as a sharpening convolution filter, to enhance the image edges. Image Reconstruction 318, via the enhancement filtering that uses information from the Bitstream Engine 3125, can enhance input image details without amplifying the compression artifacts.

Image Reconstruction 318, in step 1028, performs temporal analysis, which utilizes multiple scenes to filter the images and to record the object motion information, then performs a super-resolution multiframe reconstruction. For input data that was interlaced, Image Reconstruction 318 de-interlaces the input fields. Image Reconstruction 318, using temporal analysis, performs median filtering and reconstructs the spatial resolution of each image based on the information from the neighboring images. Image Reconstruction 318 uses Motion Estimator 3180 to estimate the motion information for objects that were detected during the scene analysis in step 1024.

Image Reconstruction 318, in steps 1020, 1024, and 1028, can utilize additional information from a bitstream. The additional information can be provides as side information to the video bitstream such as layered coding or object shape information, or additional information can be part of the compliant bitstream coded in a special way that is only visible to an enhanced decoder. A geometric transform module as part of IR318 can reconstruct coded objects, synthetic data and data from multiple camera views into an enhanced DIP output image.

Figure 11:
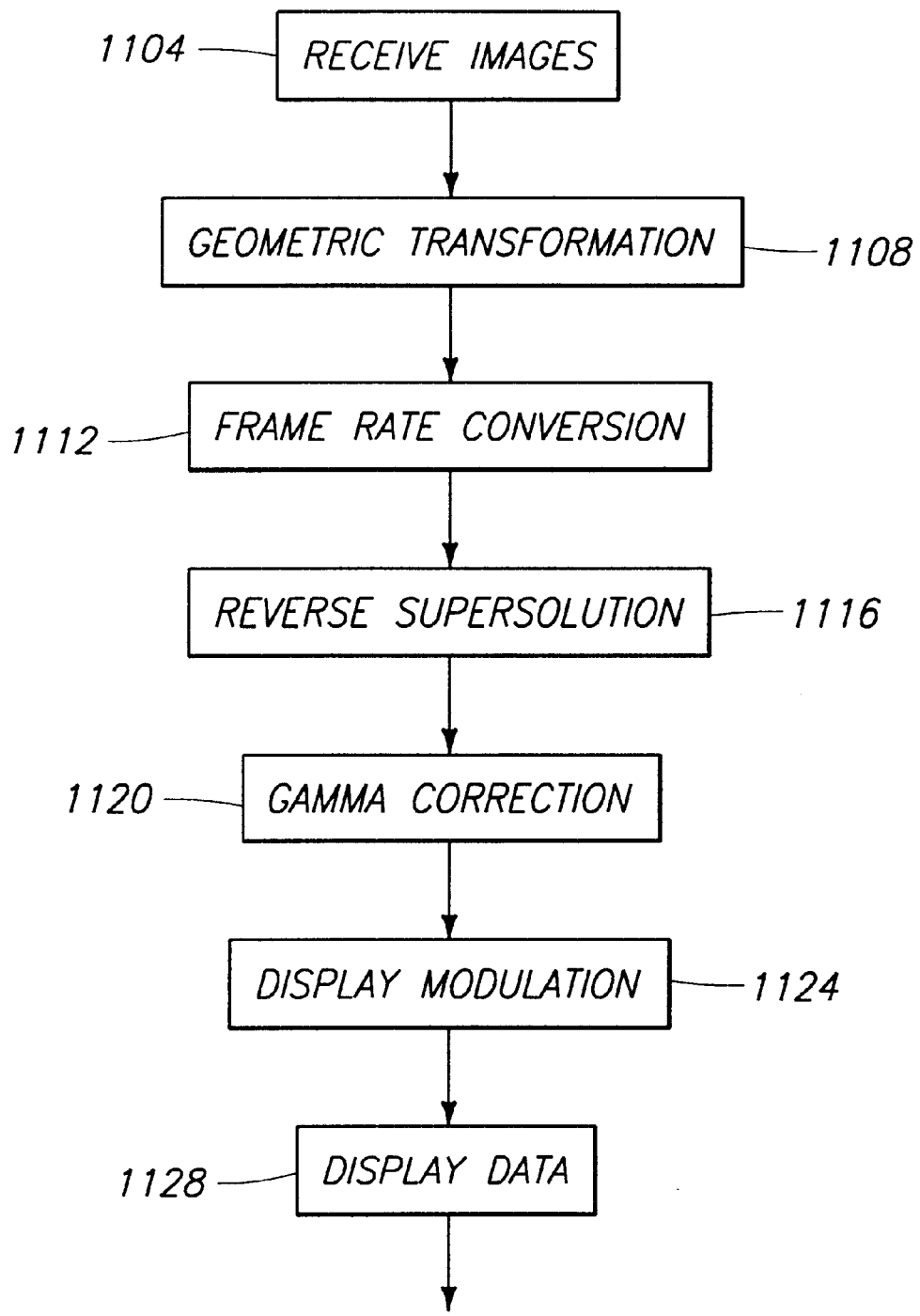
FIG. 11 is a flowchart of method steps illustrating DOP 230's image processing, in accordance with one embodiment of the present invention.

FIG. 11 is a flowchart illustrating DOP 230's image processing steps. DOP 230, in step 1104, receives DIP 210 outputs which include both the spatially enhanced image and supplemental information that includes, for example, motion information, other object or block based information, sensor or multi-camera view information, and other information about the images. In step 1108, DOP 230 combines DIP 210 outputs with the display system information to perform image geometric transformation including spatial transformation, alignment/rotation, focus, and distortion correction. Geometric transformation can improve display deficiencies related to the display environment, such as introduced by image modulator 245, display screen 260, and display system optics 120. Geometric transformation can also produce enhanced output images that correct for special environments such as head-mounted, panoramic, and stereoscopic display systems. The spatial filtering techniques of Geometric Transformation 404 can use traditional real-time 3D graphics techniques such as texture mapping to achieve the desired image manipulations.

DOP 230, in step 1108, via Multiframe Correlation 514, increases the spatial resolution of the transformed output frames. Multiframe Correlation 514 uses motion vector information, either alone, or in combination with the original bitstream input, a Bitstream Engine 3125 enhanced version of the original bitstream, or the Motion Estimator 3180. Combining the spatial and temporal processing that utilizes the information of multi frames (versus just one frame) allows increasing the image output resolution, which, along with other steps, allows the image output resolution to be higher than the input resolution.

DOP 230, in step 1112, performs frame rate conversion (FRC), which also uses the motion vector information in motion compensated filtering. FRC is usually required where the input frame rate is different than the output frame rate. For highest visual display quality, FRC uses both the transformed image data and the supplemental information, such as motion vector information, to produce a unique set of motion compensated output frames. These unique output frames temporally adjust the output images to produce smooth and accurate motion portrayal. For example, DOP 230 can use motion vector information to produce an output image where an object that changes location from one input frame to the next is shown to be fractionally between the two locations for the output frame. DOP 230 also uses motion compensated filtering for the special display environments such as a panoramic system where the motion portrayal needs to correct for the non-uniform nature of having a curved display screen 260.

In step 1116, DOP 230, via RSR 414, performs image RSR, which is a special case of FRC where the output frame sequencing is not only for motion portrayal, but also for increasing the apparent spatial resolution of the display. RSR is particularly applicable to display systems where image modulator 245 supports a high refresh rate. RSR 414 may perform system frame rate conversion. Alternatively, Multiframe Correlation 514 of Geometric Transformation 404 may generate the RSR frames. RSR produces the highest image quality when the motion compensated filtering is carefully matched to small block sizes or to individual pixels. Like Multiframe Correlation 514 and FRC, RSR 414 utilizes motion vectors for generating output frames.

In step 1120, DOP 230 uses Color/Spatial Gamma Correction 410 and Temporal Gamma Processing 412 to perform gamma correction both spatially and temporally. Gamma correction translates each display pixel and assures that the display system achieves the full color gamut. Gamma correction preferably uses gamma correction tables loaded during system configuration.

In step 1124, DOP 230 uses Display Modulator 420 to control the sending of display images to image modulator 245. For special displays that contain multiple simultaneous images, such as a panoramic or stereoscopic display system, Display Modulator 420 may sequence or control the output of more than one output image.

DOP 230, in steps 1112, 1116, 1120, and 1124, takes account of manufacturing defects, calibration data, environment effects, and user controlled setup information. Each processing step 1112, 1116, 1120, and 1124 can also support multiple simultaneous images that are used for a multiple window display or advanced picture-in-picture display. Additional display output information such as on-screen display and overlay information is also merged into the display stream such that it becomes part of the output image.

DOP 230, in step 1128, sends display images and control information to a digital memory or image modulator 245, which provides images to display screen 260, either directly or through a projector.

The present invention has been explained above with reference to several embodiments. Other embodiments will be apparent to those skilled in the art in light of this disclosure. For example, system 200 of the invention may be implemented in various configurations including hardware, software, some combination of fixed function, configurable logic, or programmable hardware. These and other variations upon the preferred embodiment are contemplated by the present invention, which is limited only by the appended claims.

What is claimed is:

1. An image processing apparatus for receiving bitstream data and processing said bitstream data to provide video stream image data to a display device, comprising:

a display input processor (DIP) coupled to a databus, said DIP comprising an input data connector and a first plurality of processing modules configured to receive bitstream data input and reconstruct said input to generate DIP outputs;

a display output processor (DOP) coupled to said databus, said DOP comprising a second plurality of processing modules configured to process said DIP outputs for generating DOP outputs, said second plurality comprising a geometric transformation (GT) module and a post GT filtering module; and a buffer memory, coupled to said databus, configured to store said DIP outputs and said DOP outputs, and to provide said video stream image data to said display device.

2. The apparatus of claim 1 wherein said DOP comprises a display map memory (DMM).

3. The apparatus of claim 2 wherein said DMM is configured to store system configuration information which includes intensity values for setup of said display device.

4. The apparatus of claim 1 wherein said geometric transformation (GT) module is configured to geometrically transform said DIP inputs.

5. The apparatus of claim 4 wherein said GT module comprises:

a spatial transformation module configured to redefine spatial relationships between image pixels;

an alignment and rotation correction module configured to reposition image pixels;

a focus correction module configured to correct image defocus; and a distortion correction module configured to correct image distortions.

6. The apparatus of claim 5 wherein said alignment and rotation correction module is configured to rotate images.

7. The apparatus of claim 5 wherein said focus correction module is configured to correct said image for defocus resulting from image deformation and from display optics.

8. The apparatus of claim 5 wherein said spatial transformation module is configured to use frame information and motion tracking information from multiple input images to increase image resolution.

9. The apparatus of claim 8 wherein said spatial transformation module is configured to select motion tracking information from either a compressed bitstream or a motion estimator output.

10. The apparatus of claim 4 wherein said GT module is configured to improve skew, tangential symmetry, aspect angle, and scale-related distortions of said display images.

11. The apparatus of claim 4 wherein said GT module is configured to correct environment-introduced image artifacts.

12. The apparatus of claim 4 wherein said GT module is configured to correct artifacts resulting from non-uniformity of the display device.

13. The apparatus of claim 4 wherein said GT module comprises a texture mapping module.

14. The apparatus of claim 4 wherein said DOP is configured to use a mathematical formula for providing DOP outputs suitable for a panoramic projection.

15. The texture mapping module of claim 14, where said module is configured to use texture mapping to perform transitions for multi-picture displays.

16. The apparatus of claim 4 wherein said GT module comprises a multi-frame correlation module.

17. The apparatus of claim 16 wherein said multi-frame correlation module is configured to select motion compensation information from either a selected display image or a motion estimator output.

18. The apparatus of claim 1 wherein said DIP is configured to receive data as a coded bitstream, said bitstream comprising image object information, image object depths, and image motion tracking information.

19. The apparatus of claim 18 configured to provide image data for a 3D and/or a panoramic display device.

20. The apparatus of claim 19 configured to use said image object information to reposition objects in output coordinates of said panoramic display device.

21. The apparatus of claim 19 configured to output image data to film.

22. The apparatus of claim 19 configured to receive a coded input that represents two images and use said coded input to present a 3D stereoscopic image on said display device.

23. The apparatus of claim 1 configured to simultaneously receive multiple video streams and process such streams to provide an image from each video stream in a single display using Picture-in-Picture and windowing controls.

24. The apparatus of claim 23 wherein said GT module is configured to perform transition effects between the different video streams, such transition effect including fades, blends, wipes and warps.

25. The apparatus of claim 1 wherein said DIP comprises an image reconstruction module configured for performing multi-frame reconstruction to increase image resolutions.

26. The apparatus of claim 25, wherein said image reconstruction module is configured to use motion estimation vectors from an input bitstream to correlate multiple images.

27. An apparatus configured for processing bitstream data to form video stream image data for use in a display system, comprising:

a display device, coupled to said display system, for viewing image data;

a geometric transformation GT module coupled to said display device, said GT module configured to precondition said bitstream data using geometric transformations to compensate for characteristics of said display device; and a temporal gamma processing TGP module coupled to said display device, said TGP module configured to independently determine an output intensity value for each color component output to said display device.

28. The TGP module of claim 27 comprising a plurality of look-up tables, wherein said TGP is configured to use at least one of said plurality of tables for determining color correction.

29. The apparatus of claim 27 wherein said geometric transformation module comprises a spatial transformation module configured for redefining spatial relationships between image pixels derived from said bitstream information.

30. The apparatus of claim 27 wherein said geometric transformation module comprises an alignment and rotation correction module configured for repositioning said image pixels.

31. The apparatus of claim 27 wherein said geometric transformation module comprises a focus correction module configured for correcting image defocus.

32. The apparatus of claim 27 wherein said geometric transformation module comprises a distortion correction module configured for correcting image distortions.

33. The apparatus of claim 27 wherein said geometric transformation module comprises a multi-frame correlation module configured for performing motion-compensated frame rate conversion.

34. The apparatus of claim 27 wherein said geometric transformation module is configured to improve skew, tangential symmetry, aspect angle, and scale-related distortions of said image data.

* * * * *